US011937256B2

(12) United States Patent
Zewail et al.

(10) Patent No.: US 11,937,256 B2
(45) Date of Patent: Mar. 19, 2024

(54) TIME GAPS IN MULTI-SLOT GRANTS

(71) Applicant: QUALCOMM Incorporated, San Diego, CA (US)

(72) Inventors: Ahmed Abdelaziz Ibrahim Abdelaziz Zewail, San Diego, CA (US); Iyab Issam Sakhnini, San Diego, CA (US); Qiang Wu, San Diego, CA (US); Jun Ma, San Diego, CA (US); Mehmet Izzet Gurelli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 25 days.

(21) Appl. No.: 17/301,733

(22) Filed: Apr. 13, 2021

(65) Prior Publication Data

US 2021/0321448 A1 Oct. 14, 2021

Related U.S. Application Data

(60) Provisional application No. 63/009,808, filed on Apr. 14, 2020.

(51) Int. Cl.
| | |
|---|---|
| *H04W 72/23* | (2023.01) |
| *H04L 1/00* | (2006.01) |
| *H04W 72/0446* | (2023.01) |
| *H04W 72/1263* | (2023.01) |

(52) U.S. Cl.
CPC ........... *H04W 72/23* (2023.01); *H04L 1/0068* (2013.01); *H04W 72/0446* (2013.01); *H04W 72/1263* (2013.01)

(58) Field of Classification Search
CPC ............ H04L 1/0068; H04W 72/0446; H04W 72/1263; H04W 72/14
See application file for complete search history.

(56) References Cited

U.S. PATENT DOCUMENTS

| | | | | |
|---|---|---|---|---|
| 2006/0256757 | A1* | 11/2006 | Kuusela | ................ H04W 76/28 370/335 |
| 2017/0041773 | A1* | 2/2017 | Fujishiro | ............... H04W 48/12 |
| 2017/0325225 | A1* | 11/2017 | Dinan | ............... H04W 72/0446 |
| 2017/0332401 | A1* | 11/2017 | Sun | ..................... H04L 27/2607 |

(Continued)

OTHER PUBLICATIONS

Apple Inc: "On HARQ and Scheduling Enhancements for NR-U," 3GPP Draft, 3GPP TSG-RAN WG1 #98bis, R1-1910958, 3rd Generation Partnership Project (3GPP), Mobile Competence Centre, 650, Route Des Lucioles, F-06921, Sophia-Antipolis Cedex, France, vol. RAN WG1. No. Chongqing, China, Oct. 14, 2019-Oct. 20, 2019, Oct. 5, 2019 (Oct. 5, 2019), XP051808752, 4 pages, Retrieved from the Internet: URL: https://ftp.3gpp.org/tsg_ran/WG1_RL1/TSGR1_98b/Docs/R1-1910958.zip R1-1910958.docx [retrieved on Oct. 5, 2019], paragraph [02.1].

(Continued)

*Primary Examiner* — Jael M Ulysse
(74) *Attorney, Agent, or Firm* — Harrity & Harrity, LLP

(57) ABSTRACT

Various aspects of the present disclosure generally relate to wireless communication. In some aspects, a user equipment (UE) may receive a multi-slot grant for one of uplink communication or downlink communication. The UE may communicate in the multi-slot grant based at least in part on information that provides an indication of one or more time gaps for the multi-slot grant. Numerous other aspects are provided.

30 Claims, 16 Drawing Sheets

(56) References Cited

U.S. PATENT DOCUMENTS

| | | | | |
|---|---|---|---|---|
| 2017/0367046 | A1* | 12/2017 | Papasakellariou | H04L 5/0048 |
| 2018/0205534 | A1* | 7/2018 | Yi | H04W 72/044 |
| 2018/0279360 | A1* | 9/2018 | Park | H04W 72/23 |
| 2018/0317244 | A1* | 11/2018 | Um | H04W 72/1215 |
| 2019/0082431 | A1* | 3/2019 | Yi | H04W 72/0446 |
| 2019/0090299 | A1* | 3/2019 | Ang | H04W 52/0229 |
| 2019/0268103 | A1* | 8/2019 | Park | H04L 1/1812 |
| 2019/0297601 | A1* | 9/2019 | You | H04W 72/23 |
| 2020/0053781 | A1* | 2/2020 | Pan | H04W 72/005 |
| 2020/0053785 | A1* | 2/2020 | Kim | H04L 5/0007 |
| 2020/0221433 | A1* | 7/2020 | Park | H04L 5/14 |
| 2020/0221504 | A1* | 7/2020 | Cirik | H04W 72/04 |
| 2020/0228230 | A1* | 7/2020 | Mukherjee | H04L 5/0055 |
| 2020/0260442 | A1* | 8/2020 | Yi | H04L 5/001 |
| 2020/0267752 | A1* | 8/2020 | Mukherjee | H04W 28/0278 |
| 2020/0313793 | A1* | 10/2020 | Jung | H04L 5/0094 |
| 2020/0314816 | A1* | 10/2020 | Yi | H04W 28/0236 |
| 2020/0329481 | A1* | 10/2020 | Yi | H04W 72/12 |
| 2020/0337029 | A1* | 10/2020 | Yi | H04L 5/0053 |
| 2020/0351919 | A1* | 11/2020 | Oh | H04W 74/006 |
| 2020/0404651 | A1* | 12/2020 | Takeda | H04W 72/0446 |
| 2021/0007149 | A1* | 1/2021 | Li | H04W 74/0833 |
| 2021/0037484 | A1* | 2/2021 | Zhou | H04L 1/1854 |
| 2021/0051672 | A1* | 2/2021 | Rastegardoost | H04W 74/006 |
| 2021/0153267 | A1* | 5/2021 | Zhang | H04W 72/30 |
| 2021/0160829 | A1* | 5/2021 | Park | H04L 1/1887 |
| 2021/0167900 | A1* | 6/2021 | Karaki | H04L 1/1822 |
| 2021/0204311 | A1* | 7/2021 | Takeda | H04W 72/1289 |
| 2021/0218502 | A1* | 7/2021 | Park | H04L 5/0055 |
| 2021/0345385 | A1* | 11/2021 | Karaki | H04L 5/0048 |
| 2022/0070911 | A1* | 3/2022 | Baldemair | H04L 5/0094 |
| 2022/0104259 | A1* | 3/2022 | Li | H04W 74/0816 |
| 2022/0131725 | A1* | 4/2022 | Li | H04L 5/0048 |
| 2022/0167389 | A1* | 5/2022 | Kim | H04L 1/08 |
| 2022/0174667 | A1* | 6/2022 | Lei | H04W 72/23 |
| 2022/0174735 | A1* | 6/2022 | Li | H04W 74/0816 |
| 2022/0191788 | A1* | 6/2022 | van der Zee | H04W 52/0216 |
| 2022/0201605 | A1* | 6/2022 | Yang | H04W 52/0235 |

OTHER PUBLICATIONS

International Search Report and Written Opinion—PCT/US2021/070388—ISA/EPO—dated Aug. 3, 2021.

Orfanos G., et al., "A Centralized MAC Protocol with QoS Support for Wireless LANs", IEEE International Symposium on Personal, Indoor and Mobile Radio Communications, Pimrc, IEEE, PI, XX, Sep. 1, 2007 (Sep. 1, 2007), 5 pages, XP031168598, ISBN: 978-1-4244-1143-6, p. 2-p. 3, figures 1,3, figures 1.4.

Qualcomm Incorporated: "Enhancements to Scheduling and HARQ Operation for NR-U," 3GPP Draft, 3GPP TSG RAN WG1 Meeting #96, R1-1902987, 7.2.2.2.3, Enhancements to Scheduling and HARQ Operation for NR-U, 3rd Generation Partnership Project (3GPP), Mobile Competence Centre, 650, Route Des Lucioles, F-06921, Sophia-Antipolis Cedex, France, vol. RAN WG1. No. Athens, Greece, Feb. 25, 2019-Mar. 1, 2019, Feb. 16, 2019 (Feb. 16, 2019), XP051600684, 12 pages, Retrieved from the Internet: URL: http://www.3gpp.org/ftp/tsg%5Fran/WG1%5FRL1/TSGR1%5F96/Docs/R1%2D1902987%2Ezip [retrieved on Feb. 16, 2019] paragraph [4.2.2]—paragraph [4.2.3], figure 6.

* cited by examiner

TIME GAPS IN MULTI-SLOT GRANTS

CROSS-REFERENCE TO RELATED APPLICATION

This Patent Application claims priority to U.S. Provisional Patent Application No. 63/009,808, filed on Apr. 14, 2020, entitled "TIME GAPS IN MULTI-SLOT GRANTS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for time gaps in multi-slot grants.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a UE, may include receiving a multi-slot grant for one of uplink communication or downlink communication; and communicating in the multi-slot grant based at least in part on information that provides an indication of one or more time gaps for the multi-slot grant.

In some aspects, a method of wireless communication, performed by a base station, may include transmitting a multi-slot grant, for one of uplink communication or downlink communication, for a UE; transmitting, to the UE, information that provides an indication of one or more time gaps for the multi-slot grant; and communicating with the UE in the multi-slot grant according to the one or more time gaps.

In some aspects, a UE for wireless communication may include a memory and one or more processors coupled to the memory. The memory and the one or more processors may be configured to receive a multi-slot grant for one of uplink communication or downlink communication; and communicate in the multi-slot grant based at least in part on information that provides an indication of one or more time gaps for the multi-slot grant.

In some aspects, a base station for wireless communication may include a memory and one or more processors coupled to the memory. The memory and the one or more processors may be configured to transmit a multi-slot grant, for one of uplink communication or downlink communication, for a UE; transmit, to the UE, information that provides an indication of one or more time gaps for the multi-slot grant; and communicate with the UE in the multi-slot grant according to the one or more time gaps.

In some aspects, a non-transitory computer-readable medium may store one or more instructions for wireless communication. The one or more instructions, when executed by one or more processors of a UE, may cause the one or more processors to receive a multi-slot grant for one of uplink communication or downlink communication; and communicate in the multi-slot grant based at least in part on information that provides an indication of one or more time gaps for the multi-slot grant.

In some aspects, a non-transitory computer-readable medium may store one or more instructions for wireless communication. The one or more instructions, when executed by one or more processors of a base station, may cause the one or more processors to transmit a multi-slot grant, for one of uplink communication or downlink communication, for a UE; transmit, to the UE, information that provides an indication of one or more time gaps for the multi-slot grant; and communicate with the UE in the multi-slot grant according to the one or more time gaps.

In some aspects, an apparatus for wireless communication may include means for receiving a multi-slot grant for one of uplink communication or downlink communication; and means for communicating in the multi-slot grant based at least in part on information that provides an indication of one or more time gaps for the multi-slot grant.

In some aspects, an apparatus for wireless communication may include means for transmitting a multi-slot grant, for one of uplink communication or downlink communication, for a UE; means for transmitting, to the UE, information that provides an indication of one or more time gaps for the multi-slot grant; and means for communicating with the UE in the multi-slot grant according to the one or more time gaps.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
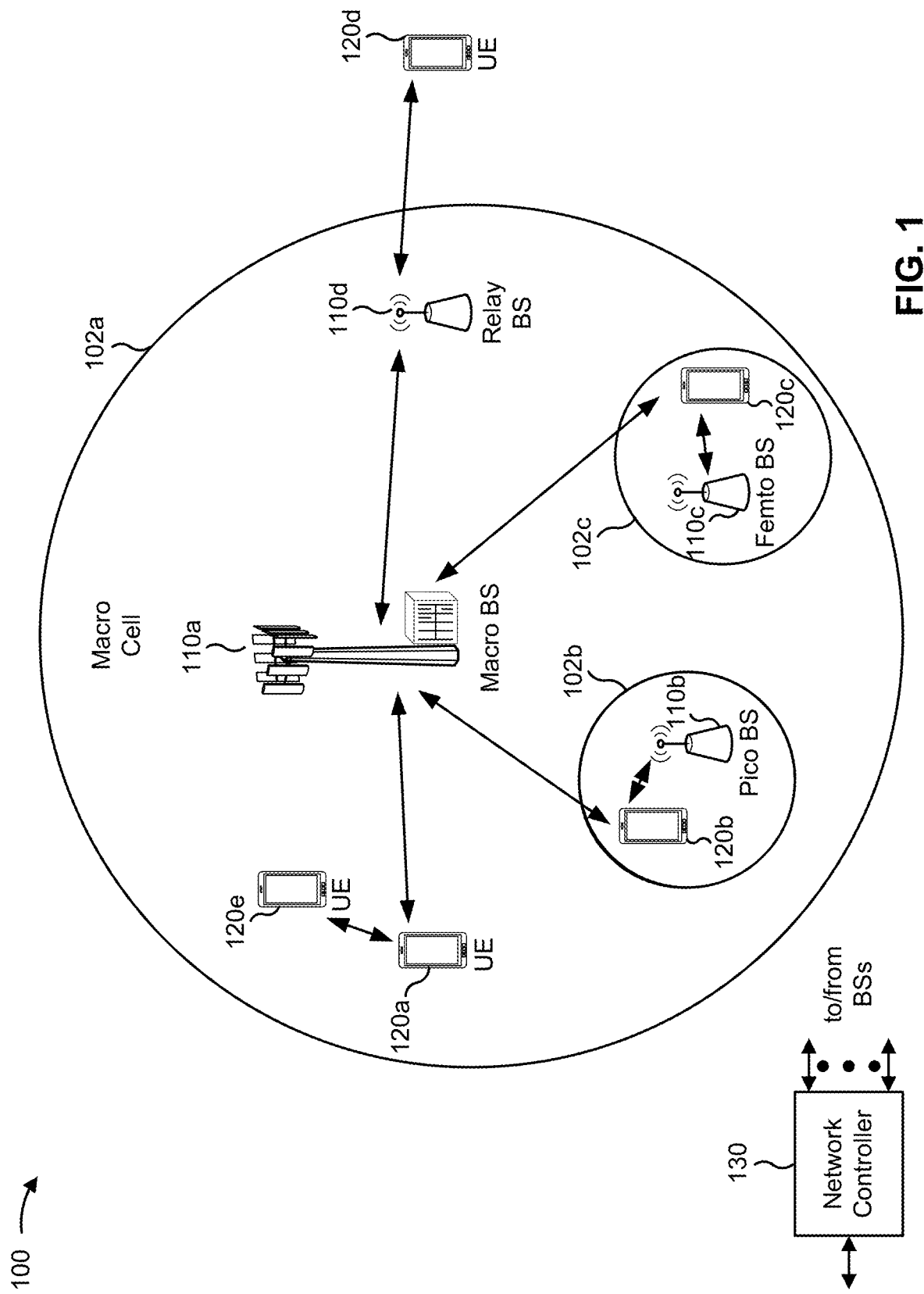
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
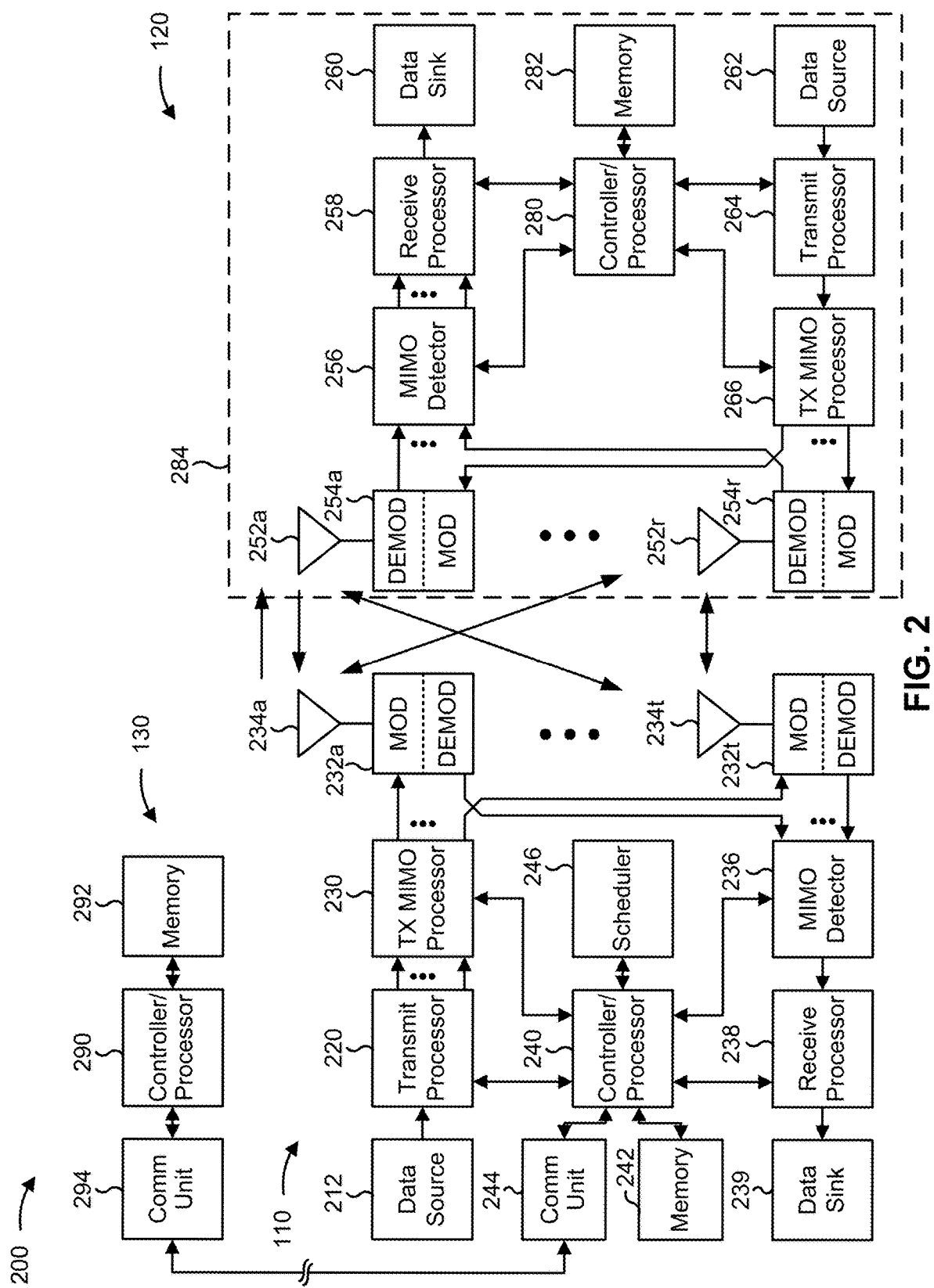
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5A-5F, 6, and 7).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5A-5F, 6, and 7).

Controller/processor 240 of base station 110, controller/processor 280 of UE 120, and/or any other component(s) of FIG. 2 may perform one or more techniques associated with time gaps in multi-slot grants, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, UE 120 may include means for receiving a multi-slot grant for one of uplink communication or downlink communication, means for communicating in the multi-slot grant based at least in part on information that provides an indication of one or more time gaps for the multi-slot grant, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting a multi-slot grant, for one of uplink communication or downlink communication, for a UE, means for transmitting, to the UE, information that provides an indication of one or more time gaps for the multi-slot grant, means for communicating with the UE in the multi-slot grant according to the one or more time gaps, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
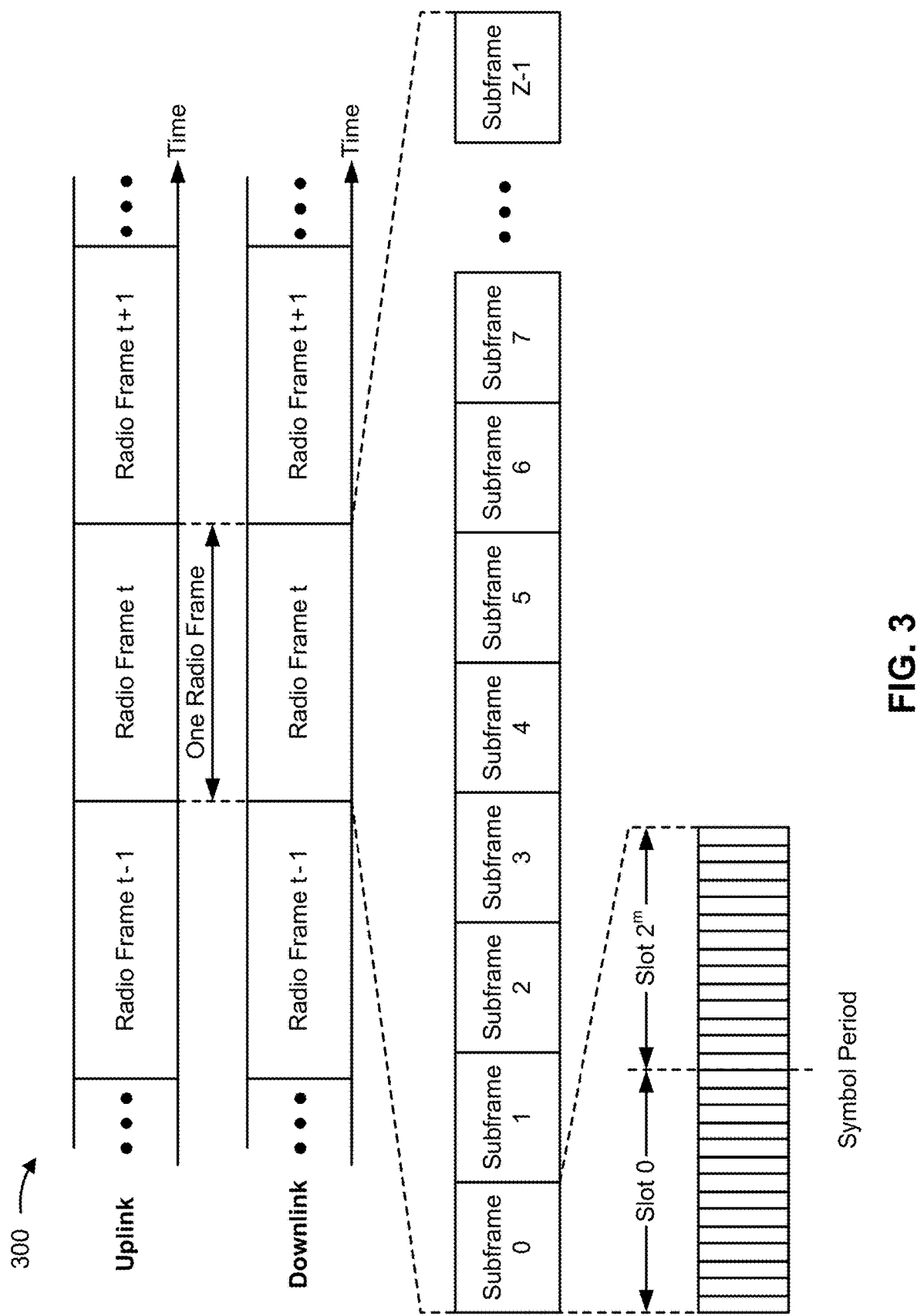
FIG. 3 is a diagram illustrating an example of a frame structure in a wireless communication network, in accordance with the present disclosure.

FIG. 3 is a diagram illustrating an example 300 of a frame structure in a wireless communication network, in accordance with the present disclosure. The frame structure shown in FIG. 3 is for frequency division duplexing (FDD) in a telecommunication system, such as LTE, NR, and/or the like. The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., 2 m slots per subframe are shown in FIG. 3, where m is an index of a numerology used for a transmission, such as 0, 1, 2, 3, 4, and/or the like). Each slot may include a set of L symbol periods. For example, each slot may include fourteen symbol periods (e.g., as shown in FIG. 3), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, mini-slot based, symbol-based, and/or the like.

As indicated above, FIG. 3 is provided as an example. Other examples may differ from what is described with respect to FIG. 3.

Figure 4:
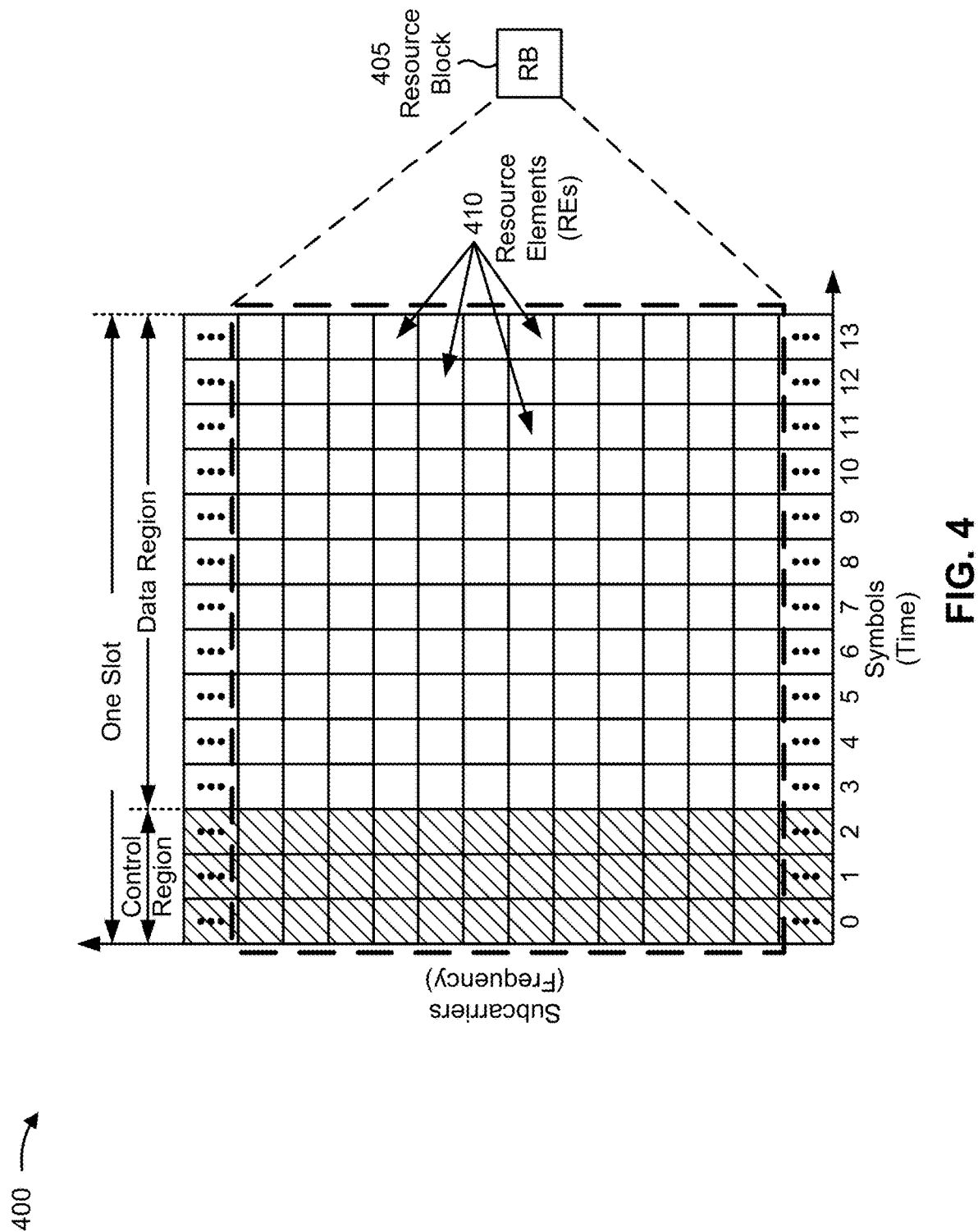
FIG. 4 is a diagram illustrating an example of a slot format, in accordance with the present disclosure.

FIG. 4 is a diagram illustrating an example 400 of a slot format, in accordance with the present disclosure. As shown in FIG. 4, time-frequency resources in a radio access network may be partitioned into resource blocks, shown by a single resource block (RB) 405. An RB 405 is sometimes referred to as a physical resource block (PRB). An RB 405 includes a set of subcarriers (e.g., 12 subcarriers) and a set of symbols (e.g., 14 symbols) that are schedulable by a base station 110 as a unit. In some aspects, an RB 405 may include a set of subcarriers in a single slot. As shown, a single time-frequency resource included in an RB 405 may be referred to as a resource element (RE) 410. An RE 410 may include a single subcarrier (e.g., in frequency) and a single symbol (e.g., in time). A symbol may be referred to as an orthogonal frequency division multiplexing (OFDM) symbol. An RE 410 may be used to transmit one modulated symbol, which may be a real value or a complex value.

In some telecommunication systems (e.g., NR), RBs 405 may span 12 subcarriers with a subcarrier spacing of, for example, 15 kilohertz (kHz), 30 kHz, 60 kHz, or 120 kHz, among other examples, over a 0.1 millisecond (ms) duration. A radio frame may include 40 slots and may have a length of 10 ms. Consequently, each slot may have a length of 0.25 ms. However, a slot length may vary depending on a numerology used to communicate (e.g., a subcarrier spacing, a cyclic prefix format, and/or the like). A slot may be configured with a link direction (e.g., downlink or uplink) for transmission. In some aspects, the link direction for a slot may be dynamically configured.

As indicated above, FIG. 4 is provided as an example. Other examples may differ from what is described with respect to FIG. 4.

To meet the growing demands for expanded mobile broadband connectivity, wireless communication technologies are advancing from LTE technology to a next generation NR technology. For example, NR may operate over a wider bandwidth (BW) at higher frequencies than LTE, such as Third Generation Partnership Project (3GPP) Frequency Range 4 (FR4) and/or higher frequency bands (e.g., 52.6 gigahertz (GHz) to 114.25 GHz).

In higher frequency bands, phase noise may be an issue for wireless communication. To combat phase noise in higher frequency bands, the OFDM waveform used for wireless communication may be transmitted with a large subcarrier spacing, such as 960 kilohertz (kHz) to 3.84 megahertz (MHz). A large subcarrier spacing (e.g., 960 kHz, 1.92 MHz, 3.84 MHz, and/or the like) may be needed to support a larger bandwidth (e.g., up to 2 GHz) with the same, or similar, Fast Fourier Transform (FFT) size (e.g., 4000 samples) as lower frequency bands.

The use of a large subcarrier spacing may result in short slot lengths. As an example, the slot length for a 120 kHz spacing in FR2 may be 125 microseconds (µs), whereas the slot length for a 960 kHz subcarrier spacing in higher frequency bands may be 15.6 µs. In some wireless communication systems, multi-slot grants may be used to reduce an amount of hybrid automatic repeat request (HARQ) processes that would otherwise be needed as a result of the short slot lengths.

However, multi-slot grants may limit the flexibility of communications in the wireless communication system. For example, in a multi-slot downlink grant, a UE may be unable to perform an uplink transmission that is needed for an ultra-reliable low-latency communication (URLLC) mode. Some techniques and apparatuses described herein provide for time gaps in multi-slot grants. In this way, the time gaps enable communication of one type to occur in a multi-slot grant for communication of another type. For example, the time gaps enable an uplink communication to occur in a multi-slot grant for downlink. As another example, the time gaps enable control communication to occur in a multi-slot grant for data communication.

Figure 5A:
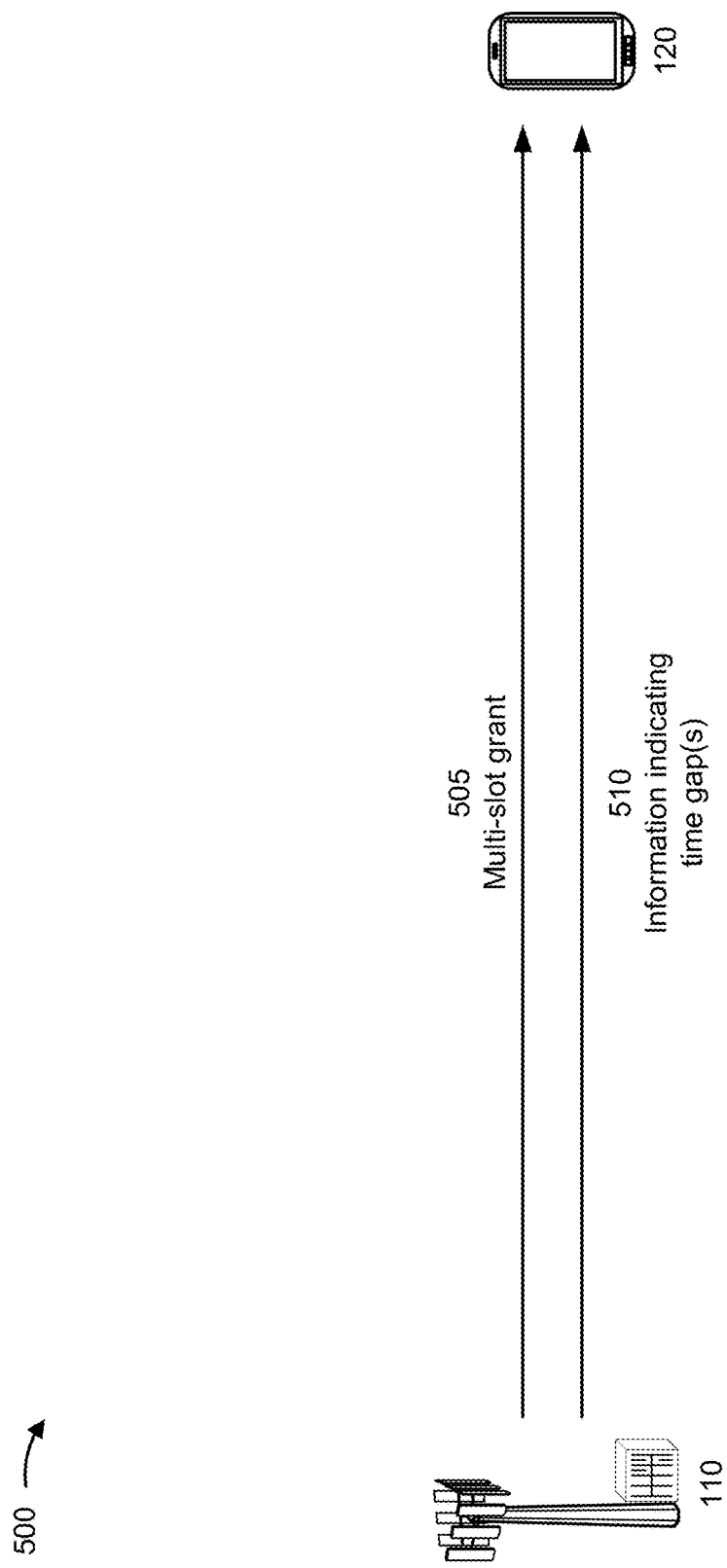
FIGS. 5A-5F are diagrams illustrating one or more examples of time gaps in multi-slot grants, in accordance with the present disclosure.
Figure 5B:
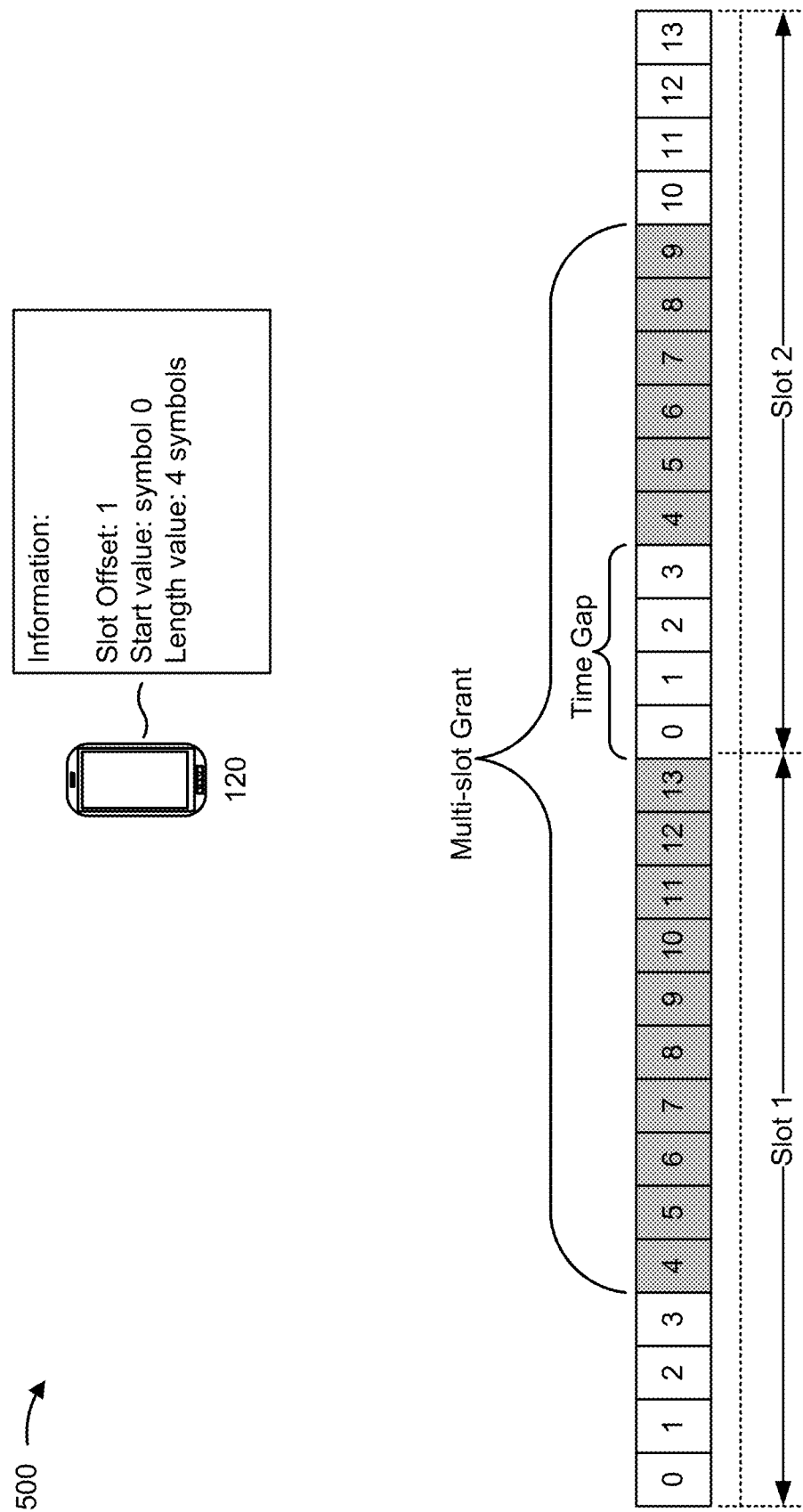
Figure 5C:
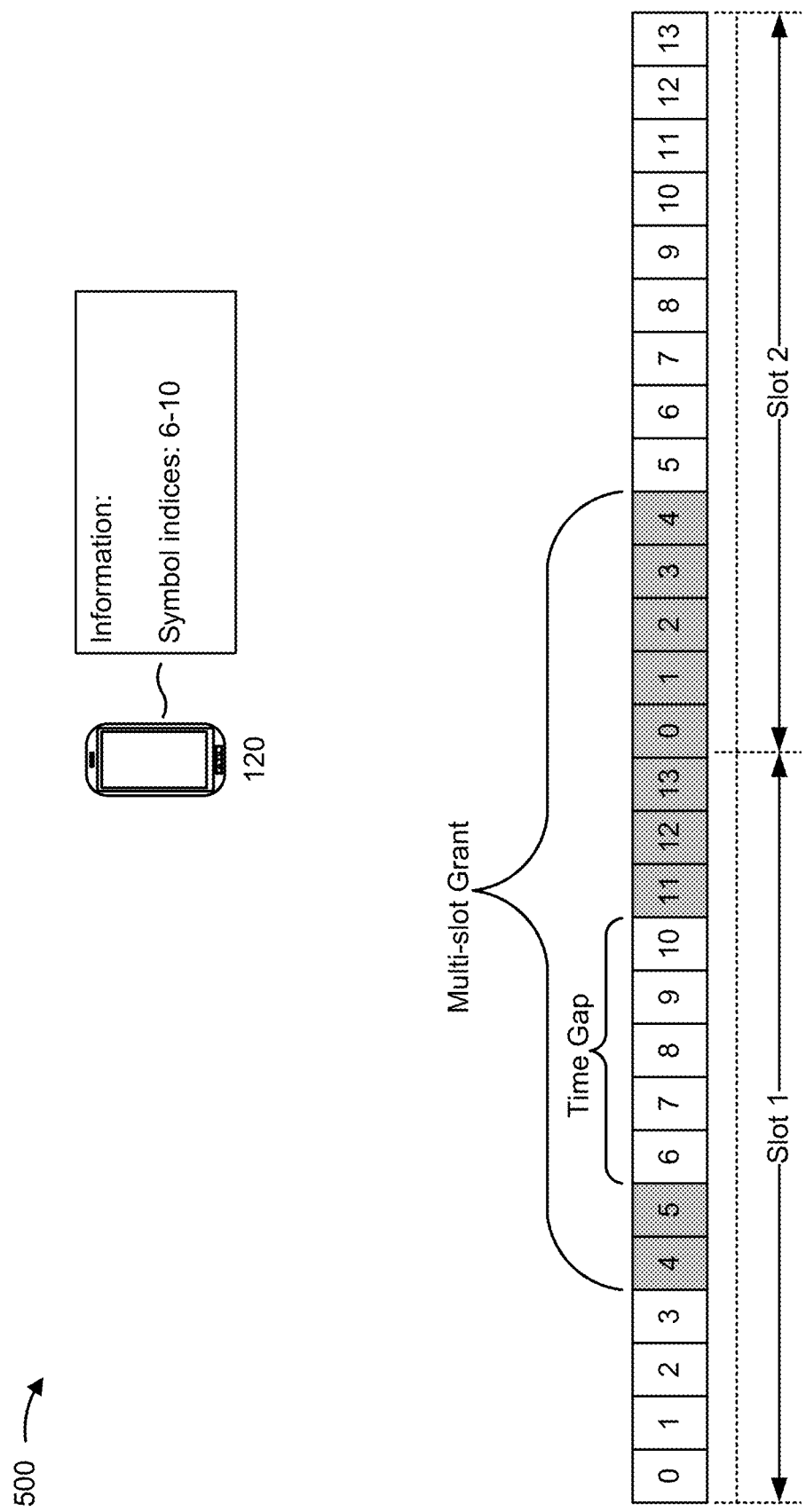
Figure 5D:
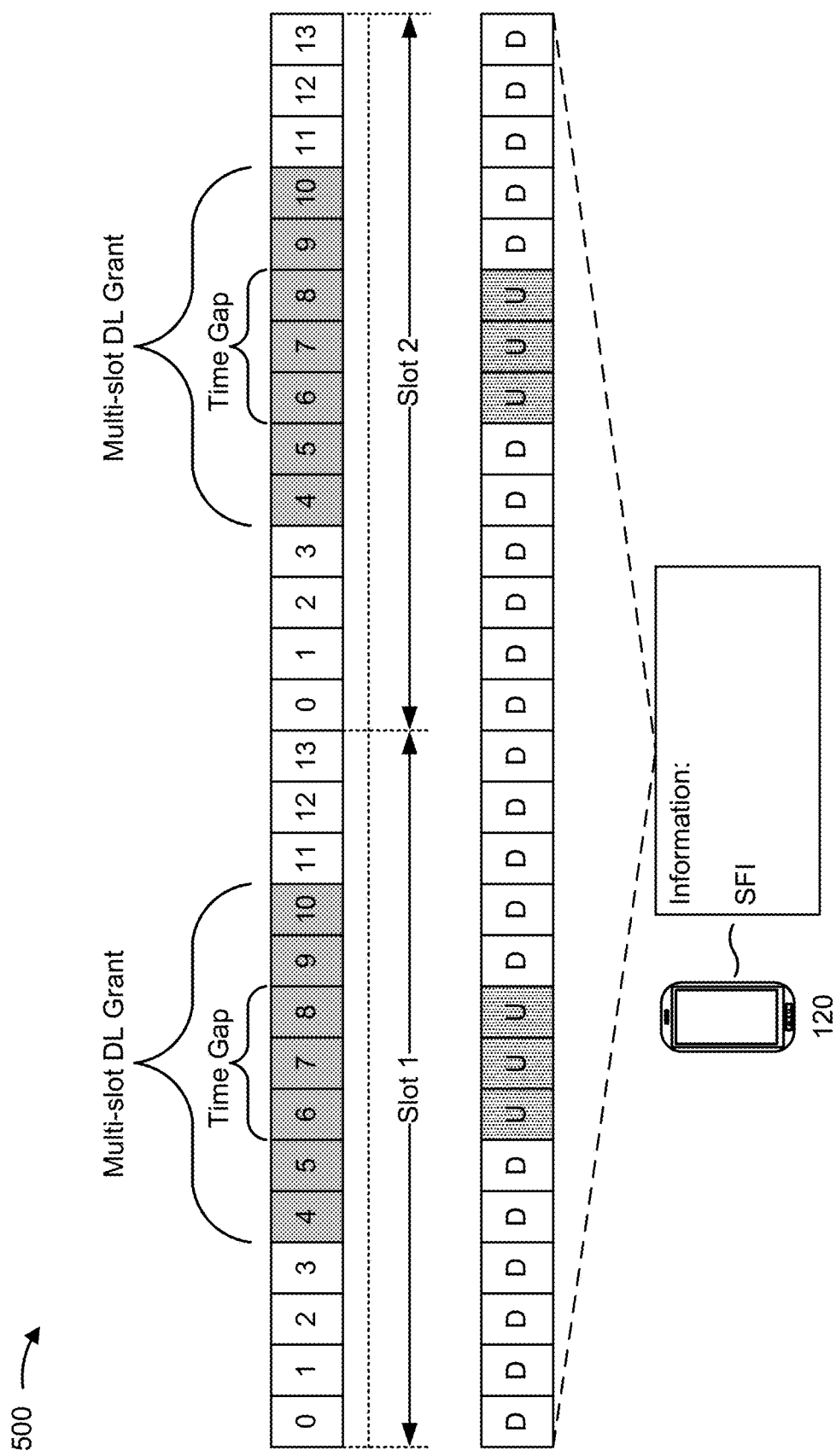
Figure 5E:
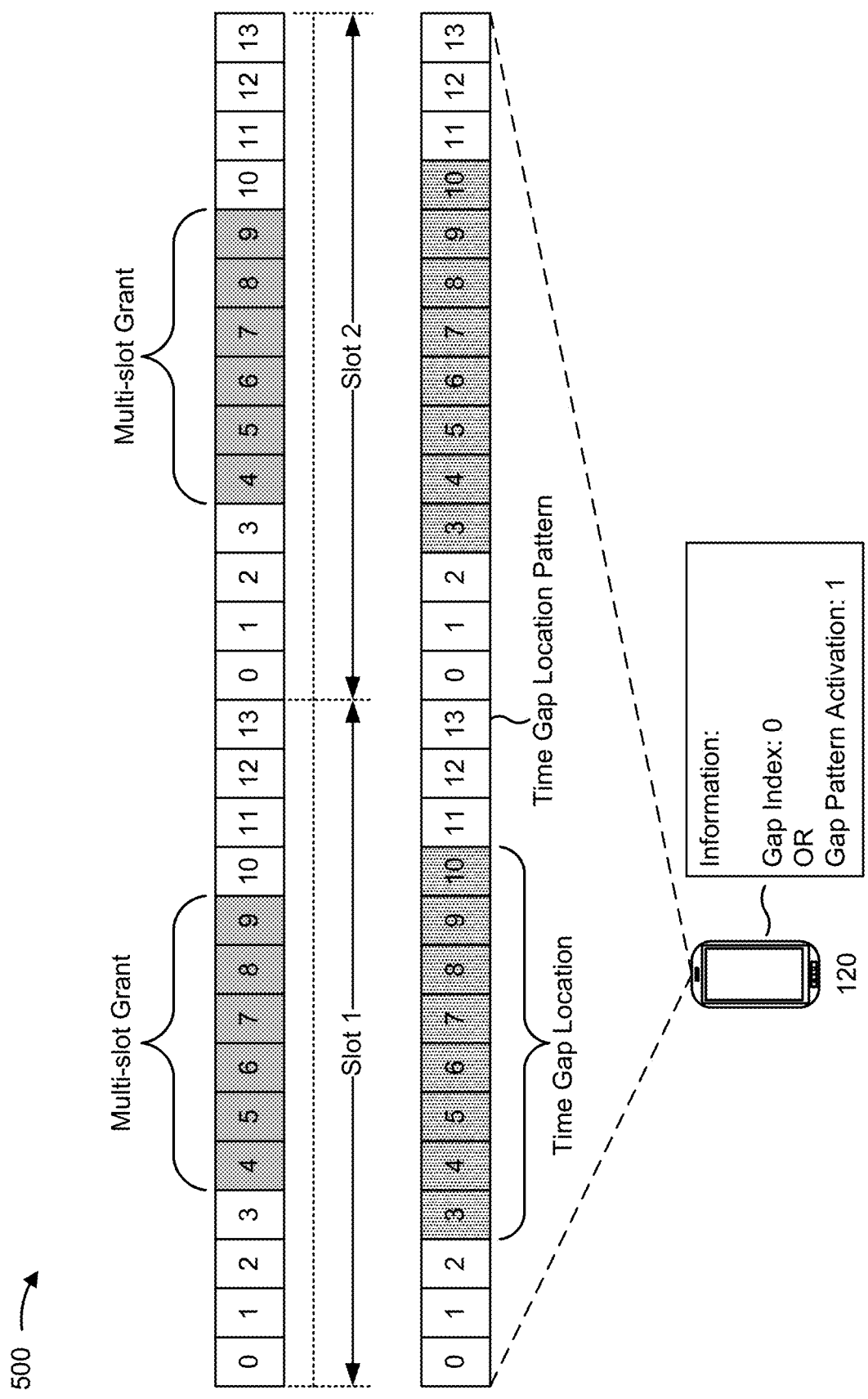
Figure 5F:
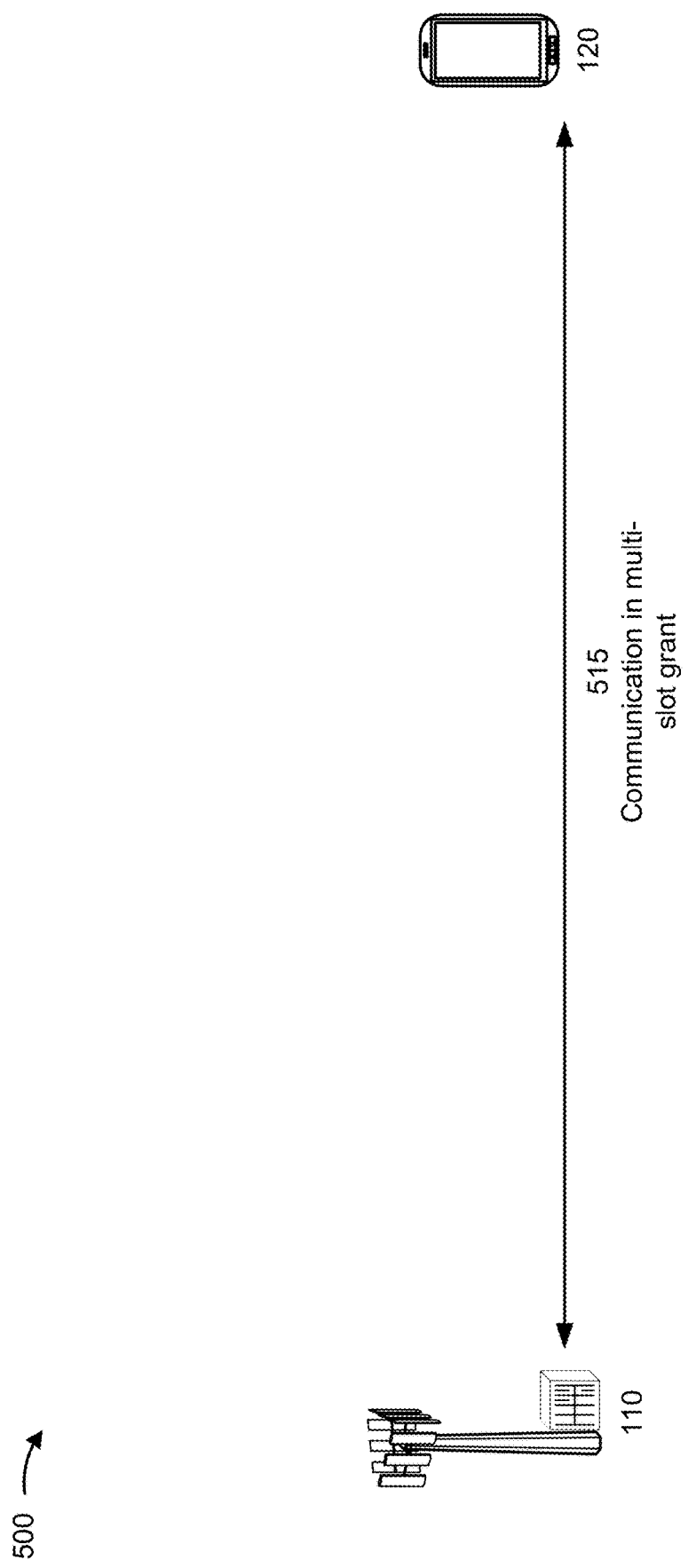

FIGS. 5A-5F are diagrams illustrating one or more examples 500 of time gaps in multi-slot grants, in accordance with the present disclosure. As shown in FIGS. 5A and 5F, a base station 110 and a UE 120 may communicate with one another. In some aspects, the base station 110 and the UE 120 may communicate in one or more higher frequency bands (e.g., 52.6 GHz to 114.25 GHz). Accordingly, the base station 110 and the UE 120 may communicate using a large subcarrier spacing (e.g., 960 kHz or greater) and a short slot length (e.g., 15.6 µs or less).

As shown in FIG. 5A, and by reference number 505, the base station 110 may transmit, and the UE 120 may receive, a grant that schedules transmission or reception for the UE 120 over multiple slots (i.e., a multi-slot grant). For example, the multi-slot grant may be for uplink communication of the UE 120 (e.g., in a physical uplink shared channel (PUSCH)) or downlink communication of the UE 120 (e.g., in a physical downlink shared channel (PDSCH)). The multi-slot grant may be, or may be included in, downlink control information (DCI) transmitted by the base station 110 (e.g., in a physical downlink control channel (PDCCH)). While example 500 is described in terms of a multi-slot grant, in some aspects, the grant may schedule transmission or reception for the UE 120 over multiple sets of symbols (e.g., a set of symbols may include one or more symbols) in a single slot (i.e., a multi-symbol grant).

In some aspects, the multi-slot grant may be indicated (e.g., in DCI) by a start and length indicator value (SLIV). For example, the SLIV may be associated with a length of greater than a maximum quantity symbols in a slot (e.g., 14 symbols), thereby indicating the multi-slot grant. In some aspects, the UE 120 may be associated with a time domain resource allocation (TDRA) configuration, such as a TDRA table, and/or the like, that configures (e.g., in one or more entries of the TDRA table) a TDRA of greater than a maximum quantity symbols in a slot.

In some aspects, the multi-slot grant may be indicated (e.g., in DCI) by a parameter that identifies a quantity of slots associated with the grant. In one example, a start value of a SLIV may indicate a starting symbol in a first slot, of the quantity of slots, and a length value of the SLIV may indicate an ending symbol in a last slot, of the quantity of slots, to thereby indicate a resource allocation of the multi-slot grant. In another example, a start value of a SLIV may indicate a starting symbol, and a length value of the SLIV may indicate an ending symbol, that indicate a resource allocation of the multi-slot grant in each of the quantity of slots. In this example, periodic gaps in the multi-slot grant may occur between (e.g., before and/or after) resource allocations in the quantity of slots.

As shown by reference number 510, the base station 110 may transmit, and the UE 120 may receive, information that provides an indication of one or more time gaps that are to be used for the multi-slot grant. Accordingly, the base station 110 may determine one or more time gaps that are to be used for the multi-slot grant, and may transmit the information based at least in part determining the one or more time gaps. In some aspects, the base station 110 may determine the one or more time gaps based at least in part on a determination that the UE 120 is to transmit or receive a communication of one type in a multi-slot grant for communication of another type. For example, the base station 110 may determine that the UE 120 is to communicate in one direction (e.g., one of uplink or downlink) in a multi-slot grant associated with another direction (e.g., the other of uplink or downlink). As another example, the base station 110 may determine that the UE 120 is to receive a control communication in a multi-slot grant for data communication.

In some aspects, the base station 110 may transmit the information via at least one of radio resource control (RRC) signaling or DCI. For example, the DCI associated with the multi-slot grant also may identify the information. As another example, the multi-slot grant and the information may be associated with different DCI. In some aspects, the base station 110 may provide a configuration for one or more time gaps via RRC signaling, and DCI may include information indicating an activation of the configuration for the one or more time gaps.

In some aspects, the UE 120 may determine one or more time gaps that are to be used in the multi-slot grant based at least in part on the information, as described below. In some aspects, the information used by the UE 120 to determine the one or more time gaps may not be transmitted by the base station 110 (e.g., the information may be stored by the UE, persistently configured for the UE, and/or the like). In some aspects, the one or more time gaps may be a single time gap in the multi-slot grant or multiple (e.g., periodic) time gaps in the multi-slot grant.

As shown in FIG. 5B, the information (e.g., in DCI) may indicate a grant for the one or more time gaps. For example, the information may indicate one or more timing values, such as one or more slot offsets, and one or more SLIVs that identify the one or more time gaps. That is, a slot offset and a SLIV may identify a time gap. In some aspects, the slot offset may be referred to as a K4 value. The slot offset indicates a slot, of the multi-slot grant, that is to include the time gap. For example, as shown, the slot offset may indicate that Slot 2 of the multi-slot grant is to include the time gap. Moreover, the SLIV indicates a starting value (e.g., a starting symbol) and a length value (e.g., a quantity of symbols) for the time gap. For example, as shown, the SLIV may indicate that the time gap is to start at symbol 0 and have a length of four symbols. In this way, the UE 120 may determine the one or more time gaps based at least in part on one or more slot offsets and one or more SLIVs.

In some aspects, the UE 120 may prioritize a grant for the one or more time gaps over the multi-slot grant. That is, the grant for the one or more time gaps may overwrite the multi-slot grant. For example, the base station 110 and/or the UE 120 may puncture one or more symbols of the multi-slot grant that overlap with the grant for the one or more time gaps.

As shown in FIG. 5C, the information (e.g., in DCI) may indicate one or more slots or symbols of the multi-slot grant that are to be skipped (e.g., not used in the multi-slot grant). For example, the information may indicate one or more slot indices of slots that are to be skipped and/or one or more symbol indices of symbols that are to be skipped. In some aspects, the indicated symbols are skipped in each slot of the multi-slot grant. As an example, as shown, the information may indicate that symbols of the multi-slot grant associated with symbol indices 6, 7, 8, 9, and 10 are to be skipped. Consecutive slots or symbols that are skipped may provide a time gap. In this way, the UE 120 may determine the one or more time gaps based at least in part on an indication of the one or more slots and/or symbols that are to be skipped.

As shown in FIG. 5D, the information may indicate one or more slot format indicators (SFIs) for one or more slots of the multi-slot grant. In some aspects, the information may indicate a single SFI that is to be used for each of the slots of the multi-slot grant. An SFI may indicate a direction (e.g., uplink or downlink) assignment for one or more symbols of a slot. Accordingly, the SFI may indicate one or more symbol assignments associated with one direction (e.g., one of uplink or downlink) and the multi-slot grant may be associated with another direction (e.g., the other of uplink or downlink).

The UE 120 may determine that a time gap is associated with one or more symbols of the multi-slot grant that correspond (e.g., by symbol index) to one or more opposite-direction symbol assignments of the SFI. For example, as shown, the multi-slot grant may be for downlink (DL) communication, and an SFI may indicate that symbols associated with symbol indices 6, 7, and 8 are assigned to uplink communication (shown as U). Accordingly, the UE 120 may determine that symbols associated with symbol indices 6, 7, and 8, in Slot 1 and Slot 2 are associated with a time gap.

As shown in FIG. 5E, the UE 120 may be configured (e.g., by RRC signaling) with, or otherwise store data relating to, one or more time gap location patterns (which may also be referred to as time gap location maps). A time gap location pattern may indicate a location of one or more time gaps in one or more slots. In some aspects, a location of a time gap in a time gap location pattern may be associated with an identifier (e.g., an index value). For example, in a time gap location pattern, a first time gap location may be associated with a first identifier (e.g., a first index value), a second time gap location may be associated with a second identifier (e.g., a second index value), and so forth.

As shown in FIG. 5E, the information (e.g., in DCI) may indicate one or more identifiers (e.g., index values) of time gap locations that are to be used by the UE 120. For example, as shown, the information may indicate that a first time gap location (associated with an index value 0) of the time gap location pattern is to be used by the UE 120. Additionally, or alternatively, as shown in FIG. 5E, the information (e.g., in DCI) may indicate whether the time gap location pattern is to be used (e.g., activated) by the UE 120. For example, the information (e.g., a single bit in the DCI) may indicate a first value (e.g., zero) if the time gap location pattern is not to be used by the UE 120, or a second value (e.g., one) if the time gap location pattern is to be used by the UE 120. As an example, as shown, the information may indicate (e.g., by setting the single bit in the DCI to a value of one) that the time gap location pattern is activated. In this way, the UE 120 may determine the one or more time gaps based at least in part on one or more time gap location patterns.

In some aspects, a time gap, that is to be used by the UE 120, may overlap with the multi-slot grant in one or more symbols. In this case, the base station 110 and/or the UE 120 may rate match communications in the multi-slot grant around the one or more symbols associated with the overlap. Alternatively, the base station 110 and/or the UE 120 may puncture the multi-slot grant in the one or more symbols associated with the overlap. For puncturing, the UE 120 and/or the base station 110 may map modulated symbols to physical resources and then remove the modulated symbols for the punctured resources (e.g., the one or more symbols associated with the overlap). More specifically, modulated symbols of a channel are mapped to resources assigned to the channel, except for the punctured resources, as if the punctured resources are allocated to the channel but not mapped with modulated symbols of the channel. For puncturing, modulated symbols are mapped to the resources allocated to the channel that are not punctured in the same way whether puncturing is taking place or not. For rate matching, reserved resources (e.g., the one or more symbols associated with the overlap) do not have modulated symbols as if these resources are not allocated to the channel in the first place.

As shown in FIG. 5F, and by reference number 515, the base station 110 and the UE 120 may communicate in the multi-slot grant. That is, the base station 110 and the UE 120 may communicate in the multi-slot grant according to the one or more time gaps (e.g., based at least in part on the information that provides the indication of the one or more time gaps). For example, if the multi-slot grant is for downlink communication, the UE 120 may not receive communications, and the base station 110 may not transmit communications, in the one or more time gaps. In some aspects, the base station 110 and/or the UE 120 may transmit or receive, in the one or more time gaps, a type of communication that is different than a type of communication configured for the multi-slot grant. For example, in the one or more time gaps, the base station 110 and the UE 120 may communicate in one direction (e.g., one of uplink or downlink) that is different from another direction (e.g., the other of uplink or downlink) associated with the multi-slot grant. As another example, in the one or more time gaps, the base station 110 and the UE 120 may communicate control information (e.g., control information associated with another grant or another multi-slot grant) in a same or a different direction as the multi-slot grant (e.g., which is configured for data communication).

In some aspects, the base station 110 may transmit, and the UE 120 may receive, a grant that schedules a communication within the multi-slot grant. The base station 110 may transmit the grant in the same control resource set (CORESET) in which the multi-slot grant is transmitted, in another CORESET, in the one or more gaps in the multi-slot grant, and/or the like.

The grant may be for communication in an opposite direction relative to the multi-slot grant. As an example, the base station 110 may transmit a grant that schedules an uplink communication within a multi-slot grant for downlink communication. In this case, the UE 120 may prioritize the grant over the multi-slot grant. That is, the grant may overwrite the multi-slot grant. For example, the base station 110 and/or the UE 120 may puncture one or more symbols of the multi-slot grant that overlap with the grant. In some aspects, the base station 110 and the UE 120 may resume communication in the multi-slot grant following communication in the overlapping grant.

As indicated above, FIGS. 5A-5F are provided as one or more examples. Other examples may differ from what is described with respect to FIGS. 5A-5F.

Figure 6:
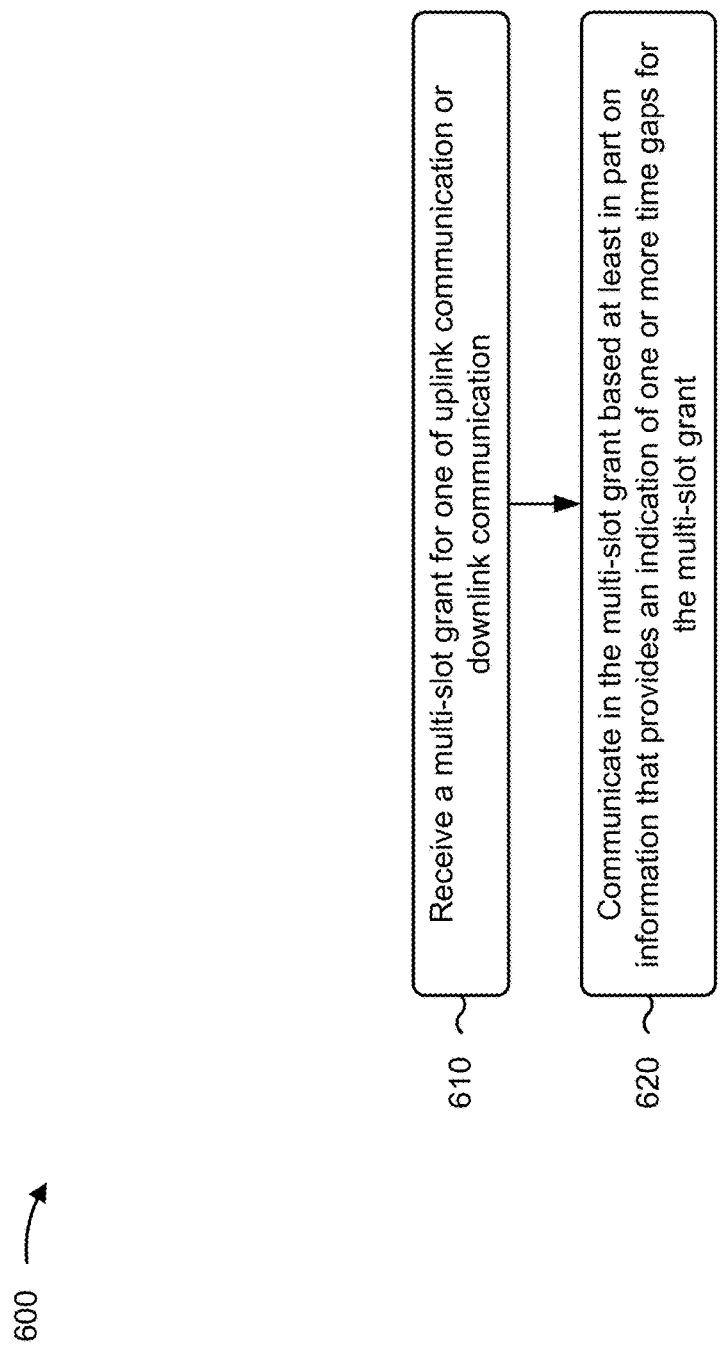
FIG. 6 is a diagram illustrating an example process performed, for example, by a UE, in accordance with the present disclosure.

FIG. 6 is a diagram illustrating an example process 600 performed, for example, by a UE, in accordance with the present disclosure. Example process 600 is an example where the UE (e.g., UE 120, and/or the like) performs operations associated with time gaps in multi-slot grants.

As shown in FIG. 6, in some aspects, process 600 may include receiving a multi-slot grant for one of uplink communication or downlink communication (block 610). For example, the UE (e.g., using antenna 252, DEMOD 254, MIMO detector 256, receive processor 258, memory 282, controller/processor 280, and/or the like) may receive a multi-slot grant for one of uplink communication or downlink communication, as described above.

As further shown in FIG. 6, in some aspects, process 600 may include communicating in the multi-slot grant based at least in part on information that provides an indication of one or more time gaps for the multi-slot grant (block 620). For example, the UE (e.g., using antenna 252, DEMOD 254, MIMO detector 256, receive processor 258, controller/processor 280, transmit processor 264, TX MIMO processor 266, MOD 254, and/or the like) may communicate in the multi-slot grant based at least in part on information that provides an indication of one or more time gaps for the multi-slot grant, as described above.

Process 600 may include additional aspects, such as any single aspect or any combination of aspects described below and/or in connection with one or more other processes described elsewhere herein.

In a first aspect, process 600 includes receiving the information via at least one of radio resource control signaling or downlink control information.

In a second aspect, alone or in combination with the first aspect, communicating in the multi-slot grant includes transmitting or receiving a communication in the one or more time gaps.

In a third aspect, alone or in combination with one or more of the first and second aspects, the information indicates a slot offset, relative to a first slot of the multi-slot grant, for the one or more time gaps and a start and length indicator value for the one or more time gaps.

In a fourth aspect, alone or in combination with one or more of the first through third aspects, the information indicates one or more slots or symbols of the multi-slot grant that are to be skipped for the one or more time gaps.

In a fifth aspect, alone or in combination with one or more of the first through fourth aspects, the information indicates a slot format indicator that identifies one or more symbols assigned to the other of uplink communication or downlink communication, and the one or more time gaps are determined to be associated with the one or more symbols.

In a sixth aspect, alone or in combination with one or more of the first through fifth aspects, locations of the one or more time gaps are respectively associated with one or more index values, and the information indicates the one or more index values.

In a seventh aspect, alone or in combination with one or more of the first through sixth aspects, the one or more time gaps are associated with a time gap pattern, and the information indicates that the time gap pattern is to be used for the multi-slot grant.

In an eighth aspect, alone or in combination with one or more of the first through seventh aspects, one or more symbols of the multi-slot grant that overlap with the one or more time gaps are punctured or are rate matched around.

In a ninth aspect, alone or in combination with one or more of the first through eighth aspects, process 600 includes receiving a grant that schedules a communication within the multi-slot grant, and one or more symbols of the multi-slot grant that overlap with the grant are punctured.

In a tenth aspect, alone or in combination with one or more of the first through ninth aspects, the grant is received in a same control resource set as the multi-slot grant or in the one or more time gaps.

In an eleventh aspect, alone or in combination with one or more of the first through tenth aspects, communicating in the multi-slot grant is resumed following the communication scheduled by the grant.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
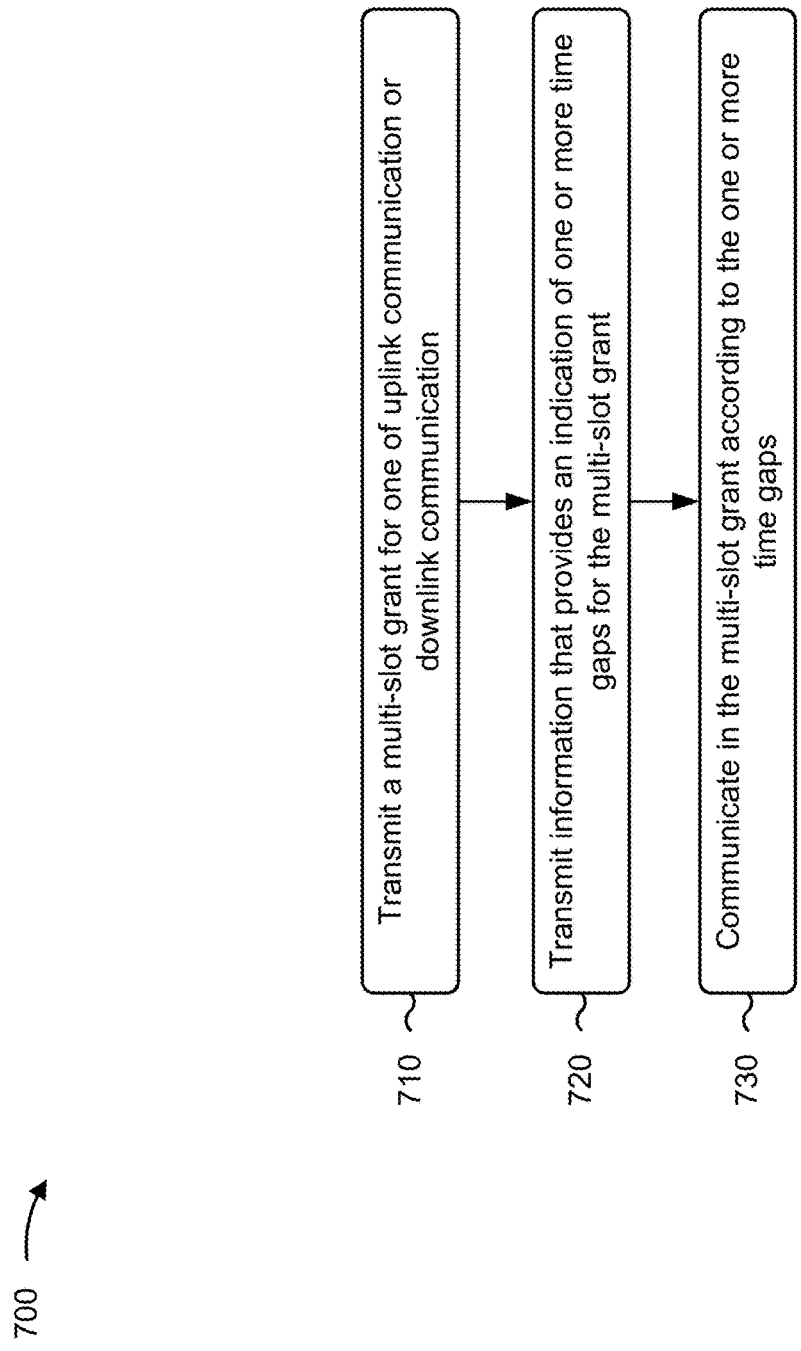
FIG. 7 is a diagram illustrating an example process performed, for example, by a base station, in accordance with the present disclosure.

FIG. 7 is a diagram illustrating an example process 700 performed, for example, by a base station, in accordance with the present disclosure. Example process 700 is an example where the base station (e.g., base station 110, and/or the like) performs operations associated with time gaps in multi-slot grants.

As shown in FIG. 7, in some aspects, process 700 may include transmitting a multi-slot grant for one of uplink communication or downlink communication (block 710). For example, the base station (e.g., using transmit processor 220, TX MIMO processor 230, modulator 232, antenna 234, memory 242, scheduler 246, controller/processor 240, and/or the like) may transmit a multi-slot grant for one of uplink communication or downlink communication, as described above.

As further shown in FIG. 7, in some aspects, process 700 may include transmitting information that provides an indication of one or more time gaps for the multi-slot grant (block 720). For example, the base station (e.g., using controller/processor 240, transmit processor 220, TX MIMO processor 230, MOD 232, antenna 234, and/or the like) may transmit information that provides an indication of one or more time gaps for the multi-slot grant, as described above.

As further shown in FIG. 7, in some aspects, process 700 may include communicating in the multi-slot grant according to the one or more time gaps (block 730). For example, the base station (e.g., using controller/processor 240, transmit processor 220, TX MIMO processor 230, MOD 232, antenna 234, DEMOD 232, MIMO detector 236, receive processor 238, and/or the like) may communicate in the multi-slot grant according to the one or more time gaps, as described above.

Process 700 may include additional aspects, such as any single aspect or any combination of aspects described below and/or in connection with one or more other processes described elsewhere herein.

In a first aspect, the information is transmitted via at least one of radio resource control signaling or downlink control information.

In a second aspect, alone or in combination with the first aspect, communicating in the multi-slot grant includes transmitting or receiving a communication in the one or more time gaps.

In a third aspect, alone or in combination with one or more of the first and second aspects, the information indicates a slot offset, relative to a first slot of the multi-slot grant, for the one or more time gaps and a start and length indicator value for the one or more time gaps.

In a fourth aspect, alone or in combination with one or more of the first through third aspects, the information indicates one or more slots or symbols of the multi-slot grant that are to be skipped for the one or more time gaps.

In a fifth aspect, alone or in combination with one or more of the first through fourth aspects, the information indicates a slot format indicator that identifies one or more symbols assigned to the other of uplink communication or downlink communication, and the one or more time gaps are associated with the one or more symbols.

In a sixth aspect, alone or in combination with one or more of the first through fifth aspects, locations of the one or more time gaps are respectively associated with one or more index values, and the information indicates the one or more index values.

In a seventh aspect, alone or in combination with one or more of the first through sixth aspects, the one or more time gaps are associated with a gap pattern, and the information indicates that the gap pattern is to be used for the multi-slot grant.

In an eighth aspect, alone or in combination with one or more of the first through seventh aspects, one or more symbols of the multi-slot grant that overlap with the one or more time gaps are to be punctured or are to be rate matched around.

In a ninth aspect, alone or in combination with one or more of the first through eighth aspects, process 700 includes transmitting a grant that schedules a communication within the multi-slot grant, and one or more symbols of the multi-slot grant that overlap with the grant are to be punctured.

In a tenth aspect, alone or in combination with one or more of the first through ninth aspects, the grant is transmitted in a same control resource set as the multi-slot grant or in the one or more time gaps.

In an eleventh aspect, alone or in combination with one or more of the first through tenth aspects, communicating in the multi-slot grant is resumed following the communication scheduled by the grant.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
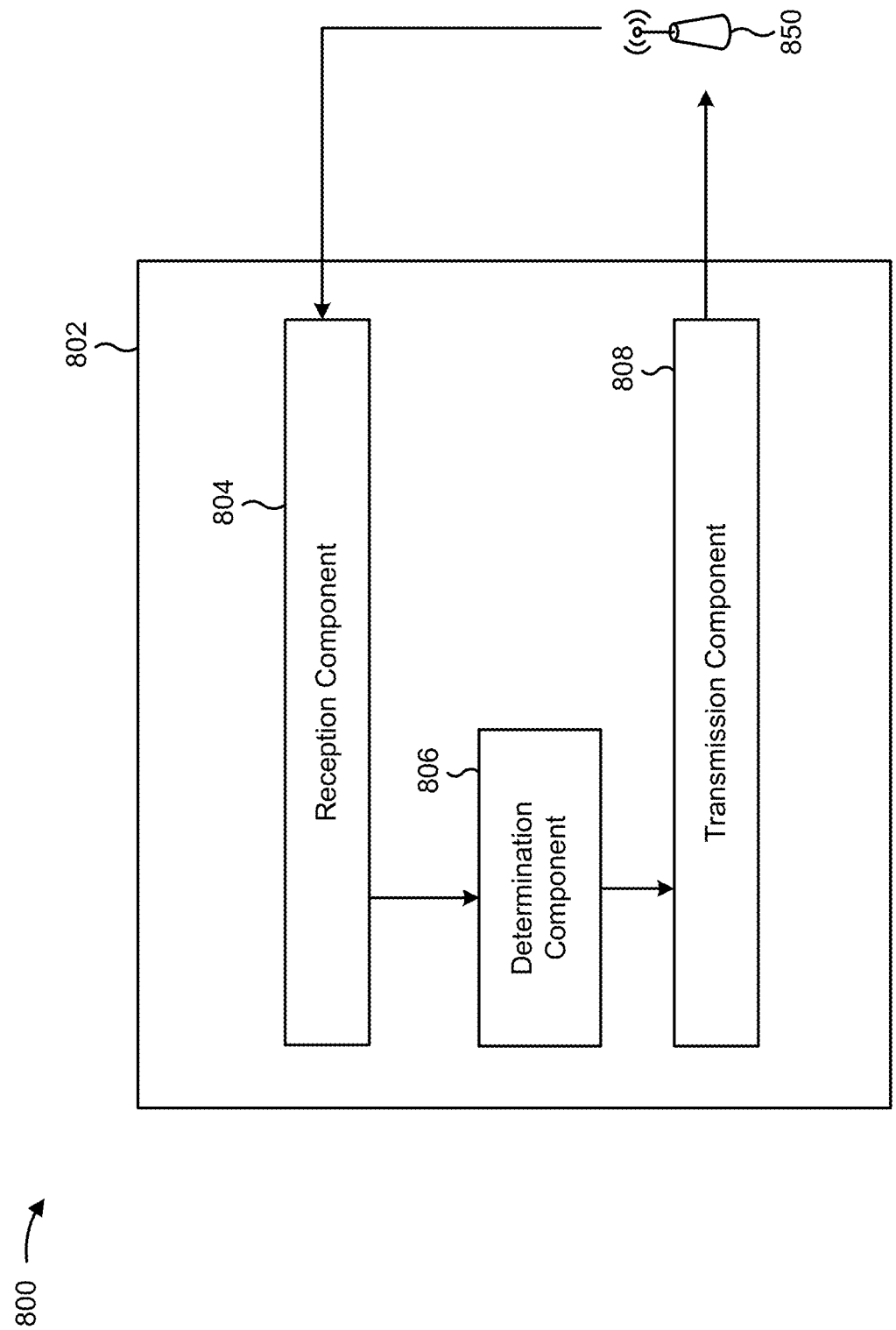
FIG. 8 is a diagram illustrating an example of a data flow between different components in an example apparatus, in accordance with the present disclosure.

FIG. 8 is a diagram 800 illustrating a data flow between different components in an example apparatus 802, in accordance with the present disclosure. The apparatus 802 may be a UE (e.g., UE 120). In some aspects, the apparatus 802 includes a reception component 804, a determination component 806, and/or a transmission component 808.

In some aspects, reception component 804 may receive a multi-slot grant. In some aspects, reception component 804 may receive information that provides an indication of one or more time gaps. For example, reception component 804 may receive the information from apparatus 850 (e.g., a BS 110). In some aspects, determination component 806 may determine one or more time gaps that are to be used in a multi-slot grant based at least in part on the information. In some aspects, reception component 804 and/or transmission component 808 may communicate in the multi-slot grant according to the one or more time gaps based at least in part on determining the one or more time gaps. For example, reception component 804 and/or transmission component 808 may communicate with the apparatus 850.

The apparatus 802 may include additional components that perform each of the blocks of the algorithm in the aforementioned process 600 of FIG. 6, process 700 of FIG. 7, and/or the like. Each block in the aforementioned process 600 of FIG. 6, process 700 of FIG. 7, and/or the like may be performed by a component and the apparatus 802 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of components (e.g., one or more components) shown in FIG. 8 may perform one or more functions described as being performed by another set of components shown in FIG. 8.

Figure 9:
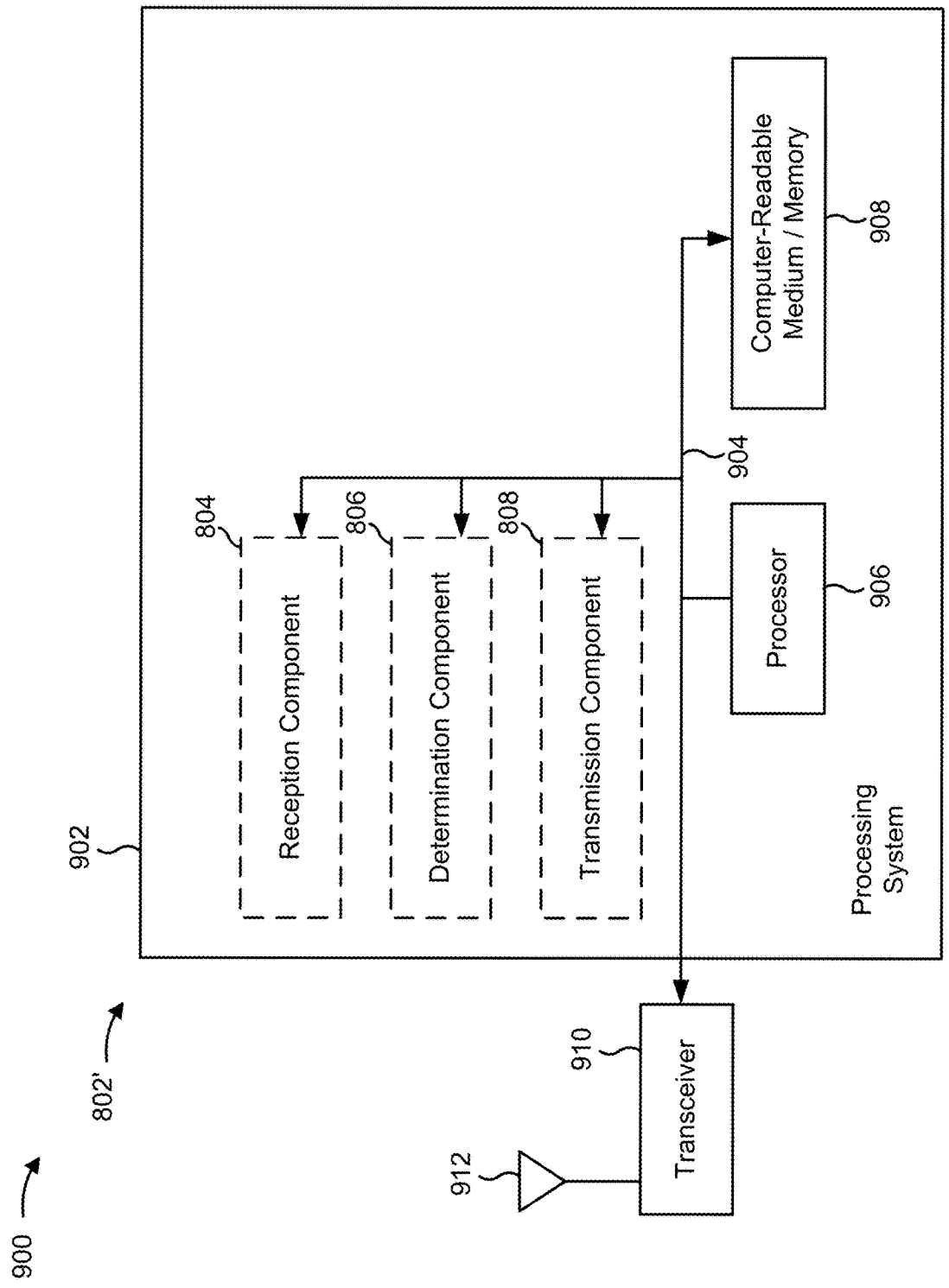
FIG. 9 is a diagram illustrating an example of a hardware implementation for an apparatus employing a processing system, in accordance with the present disclosure.

FIG. 9 is a diagram 900 illustrating an example of a hardware implementation for an apparatus 802' employing a processing system 902, in accordance with the present disclosure. The apparatus 802' may be a UE (e.g., UE 120).

The processing system 902 may be implemented with a bus architecture, represented generally by the bus 904. The bus 904 may include any number of interconnecting buses and bridges depending on the specific application of the processing system 902 and the overall design constraints. The bus 904 links together various circuits including one or more processors and/or hardware components, represented by the processor 906, the components 804, 806, and/or 808, and the computer-readable medium/memory 908. The bus 904 may also link various other circuits such as timing sources, peripherals, voltage regulators, and power management circuits, which are well known in the art, and therefore will not be described any further.

The processing system 902 may be coupled to a transceiver 910. The transceiver 910 is coupled to one or more antennas 912. The transceiver 910 provides a means for communicating with various other apparatuses over a transmission medium. The transceiver 910 receives a signal from the one or more antennas 912, extracts information from the received signal, and provides the extracted information to the processing system 902, specifically the reception component 804. In addition, the transceiver 910 receives information from the processing system 902, specifically the transmission component 808, and based at least in part on the received information, generates a signal to be applied to the one or more antennas 912. The processing system 902 includes a processor 906 coupled to a computer-readable medium/memory 908. The processor 906 is responsible for general processing, including the execution of software stored on the computer-readable medium/memory 908. The software, when executed by the processor 906, causes the processing system 902 to perform the various functions described herein for any particular apparatus. The computer-readable medium/memory 908 may also be used for storing data that is manipulated by the processor 906 when executing software. The processing system further includes at least one of the components 804, 806, and/or 808. The components may be software modules miming in the processor 906, resident/stored in the computer readable medium/memory 908, one or more hardware modules coupled to the processor 906, or some combination thereof. The processing system 902 may be a component of the UE 120 and may include the memory 282 and/or at least one of the TX MIMO processor 266, the receive processor 258, and/or the controller/processor 280.

In some aspects, the apparatus 802/802' for wireless communication includes means for receiving a multi-slot grant for one of uplink communication or downlink communication, means for communicating in the multi-slot grant based at least in part on information that provides an indication of one or more time gaps for the multi-slot grant, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like. The aforementioned means may be one or more of the aforementioned components of the apparatus 802 and/or the processing system 902 of the apparatus 802' configured to perform the functions recited by the aforementioned means. As described elsewhere herein, the processing system 902 may include the TX MIMO processor 266, the receive processor 258, and/or the controller/processor 280. In one configuration, the aforementioned means may be the TX MIMO processor 266, the receive processor 258, and/or the controller/processor 280 configured to perform the functions and/or operations recited herein.

FIG. 9 is provided as an example. Other examples may differ from what is described in connection with FIG. 9.

Figure 10:
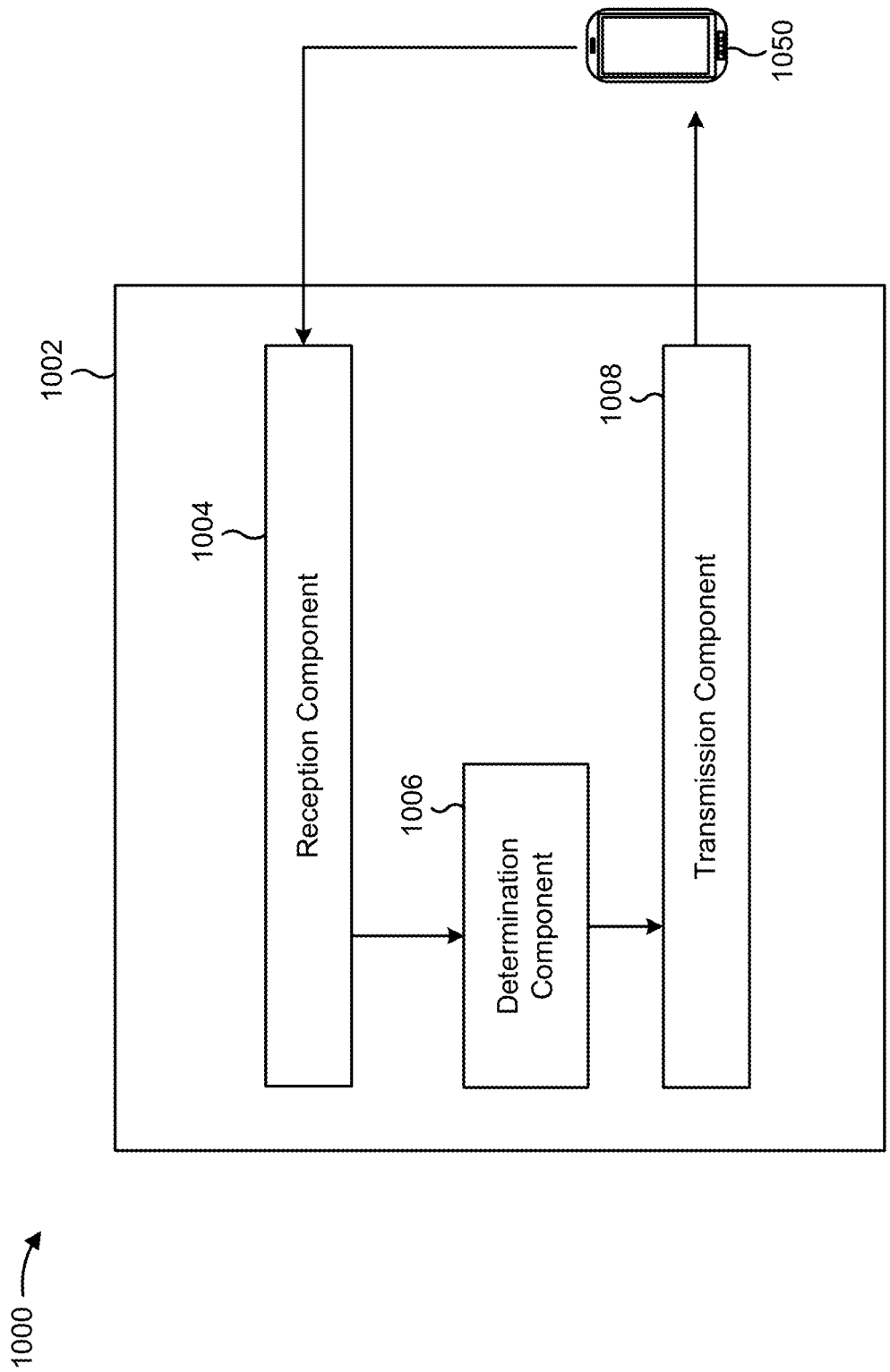
FIG. 10 is a diagram illustrating an example of a data flow between different components in an example apparatus, in accordance with the present disclosure.

FIG. 10 is a diagram 1000 illustrating a data flow between different components in an example apparatus 1002, in accordance with the present disclosure. The apparatus 1002 may be a base station (e.g., base station 110). In some aspects, the apparatus 1002 includes a reception component 1004, a determination component 1006, and/or a transmission component 1008.

In some aspects, determination component 1006 may determine one or more time gaps that are to be used in a multi-slot grant. In some aspects, transmission component 1008 may transmit a multi-slot grant. In some aspects, transmission component 1008 may transmit information that provides an indication of the one or more time gaps that are determined. For example, transmission component 1008 may transmit the information to an apparatus 1050 (e.g., a UE 120). In some aspects, reception component 1004 and/or transmission component 1008 may communicate in the multi-slot grant according to the one or more time gaps. For example, reception component 1004 and/or transmission component 1008 may communicate with the apparatus 1050.

The apparatus 1002 may include additional components that perform each of the blocks of the algorithm in the aforementioned process 600 of FIG. 6, process 700 of FIG. 7, and/or the like. Each block in the aforementioned process 600 of FIG. 6, process 700 of FIG. 7, and/or the like may be performed by a component and the apparatus 1002 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of components (e.g., one or more components) shown in FIG. 10 may perform one or more functions described as being performed by another set of components shown in FIG. 10.

Figure 11:
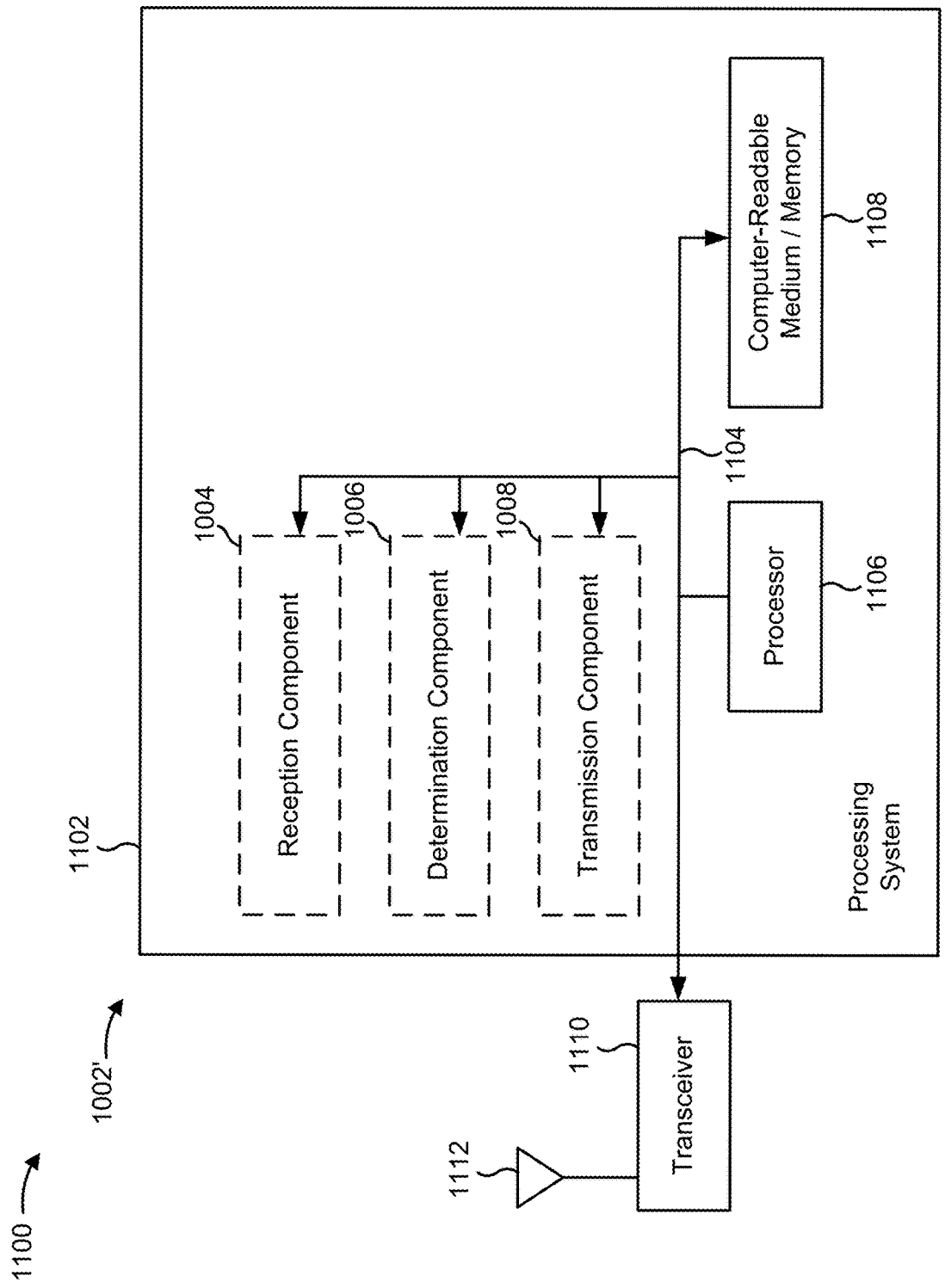
FIG. 11 is a diagram illustrating an example of a hardware implementation for an apparatus employing a processing system, in accordance with the present disclosure.

FIG. 11 is a diagram 1100 illustrating an example of a hardware implementation for an apparatus 1002' employing a processing system 1102, in accordance with the present disclosure. The apparatus 1002' may be a base station (e.g., base station 110).

The processing system 1102 may be implemented with a bus architecture, represented generally by the bus 1104. The bus 1104 may include any number of interconnecting buses and bridges depending on the specific application of the processing system 1102 and the overall design constraints. The bus 1104 links together various circuits including one or more processors and/or hardware components, represented by the processor 1106, the components 1004, 1006, and/or 1008, and the computer-readable medium/memory 1108. The bus 1104 may also link various other circuits such as timing sources, peripherals, voltage regulators, and power management circuits, which are well known in the art, and therefore will not be described any further.

The processing system 1102 may be coupled to a transceiver 1110. The transceiver 1110 is coupled to one or more antennas 1112. The transceiver 1110 provides a means for communicating with various other apparatuses over a transmission medium. The transceiver 1110 receives a signal from the one or more antennas 1112, extracts information from the received signal, and provides the extracted information to the processing system 1102, specifically the reception component 1004. In addition, the transceiver 1110 receives information from the processing system 1102, specifically the transmission component 1008, and based at least in part on the received information, generates a signal to be applied to the one or more antennas 1112. The processing system 1102 includes a processor 1106 coupled to a computer-readable medium/memory 1108. The processor 1106 is responsible for general processing, including the execution of software stored on the computer-readable medium/memory 1108. The software, when executed by the processor 1106, causes the processing system 1102 to perform the various functions described herein for any particular apparatus. The computer-readable medium/memory 1108 may also be used for storing data that is manipulated by the processor 1106 when executing software. The processing system further includes at least one of the components 1004, 1006, and/or 1008. The components may be software modules running in the processor 1106, resident/stored in the computer readable medium/memory 1108, one or more hardware modules coupled to the processor 1106, or some combination thereof. The processing system 1102 may be a component of the base station 110 and may include the memory 242 and/or at least one of the TX MIMO processor 230, the receive processor 238, and/or the controller/processor 240.

In some aspects, the apparatus 1002/1002' for wireless communication includes means for transmitting a multi-slot grant for one of uplink communication or downlink communication, means for transmitting information that provides an indication of one or more time gaps for the multi-slot grant, means for communicating in the multi-slot grant according to the one or more time gaps, and/or the like. The aforementioned means may be one or more of the aforementioned components of the apparatus 1002 and/or the processing system 1102 of the apparatus 1002' configured to perform the functions recited by the aforementioned means. As described elsewhere herein, the processing system 1102 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 11 is provided as an example. Other examples may differ from what is described in connection with FIG. 11.

The following provides an overview of some Aspects of the present disclosure:

Aspect 1: A method of wireless communication performed by a user equipment (UE), comprising: receiving a multi-slot grant for one of uplink communication or downlink communication; and communicating in the multi-slot grant based at least in part on information that provides an indication of one or more time gaps for the multi-slot grant.

Aspect 2: The method of Aspect 1, further comprising: receiving the information via at least one of radio resource control signaling or downlink control information.

Aspect 3: The method of any of Aspects 1-2, wherein communicating in the multi-slot grant comprises: transmitting or receiving a communication in the one or more time gaps.

Aspect 4: The method of any of Aspects 1-3, wherein the information indicates a slot offset, relative to a first slot of the multi-slot grant, for the one or more time gaps and a start and length indicator value for the one or more time gaps.

Aspect 5: The method of any of Aspects 1-4, wherein the information indicates one or more slots or symbols of the multi-slot grant that are to be skipped for the one or more time gaps.

Aspect 6: The method of any of Aspects 1-5, wherein the information indicates a slot format indicator that identifies one or more symbols assigned to the other of uplink communication or downlink communication, and the one or more time gaps are determined to be associated with the one or more symbols.

Aspect 7: The method of any of Aspects 1-6, wherein locations of the one or more time gaps are respectively associated with one or more index values, and the information indicates the one or more index values.

Aspect 8: The method of any of Aspects 1-7, wherein the one or more time gaps are associated with a time gap pattern, and the information indicates that the time gap pattern is to be used for the multi-slot grant.

Aspect 9: The method of any of Aspects 1-8, wherein one or more symbols of the multi-slot grant that overlap with the one or more time gaps are punctured or are rate matched around.

Aspect 10: The method of any of Aspects 1-10, further comprising: receiving a grant that schedules a communication within the multi-slot grant, wherein one or more symbols of the multi-slot grant that overlap with the grant are punctured.

Aspect 11: The method of Aspect 10, wherein the grant is received in a same control resource set as the multi-slot grant or in the one or more time gaps.

Aspect 12: The method of any of Aspects 10-11, wherein communicating in the multi-slot grant is resumed following the communication scheduled by the grant.

Aspect 13: A method of wireless communication performed by a base station, comprising: transmitting a multi-slot grant, for one of uplink communication or downlink communication, for a user equipment (UE); transmitting, to the UE, information that provides an indication of one or more time gaps for the multi-slot grant; and communicating with the UE in the multi-slot grant according to the one or more time gaps.

Aspect 14: The method of Aspect 13, wherein the information is transmitted via at least one of radio resource control signaling or downlink control information.

Aspect 15: The method of any of Aspects 13-14, wherein communicating in the multi-slot grant comprises: transmitting or receiving a communication in the one or more time gaps.

Aspect 16: The method of any of Aspects 13-15, wherein the information indicates a slot offset, relative to a first slot of the multi-slot grant, for the one or more time gaps and a start and length indicator value for the one or more time gaps.

Aspect 17: The method of any of Aspects 13-16, wherein the information indicates one or more slots or symbols of the multi-slot grant that are to be skipped by the UE for the one or more time gaps.

Aspect 18: The method of any of Aspects 13-17, wherein the information indicates a slot format indicator that identifies one or more symbols assigned to the other of uplink communication or downlink communication, and the one or more time gaps are associated with the one or more symbols.

Aspect 19: The method of any of Aspects 13-18, wherein locations of the one or more time gaps are respectively associated with one or more index values, and the information indicates the one or more index values.

Aspect 20: The method of any of Aspects 13-19, wherein the one or more time gaps are associated with a gap pattern, and the information indicates that the gap pattern is to be used by the UE for the multi-slot grant.

Aspect 21: The method of any of Aspects 13-20, wherein one or more symbols of the multi-slot grant that overlap with the one or more time gaps are to be punctured or are to be rate matched around.

Aspect 22: The method of any of Aspects 13-21, further comprising: transmitting a grant that schedules a communication within the multi-slot grant, wherein one or more symbols of the multi-slot grant that overlap with the grant are to be punctured.

Aspect 23: The method of Aspect 22, wherein the grant is transmitted in a same control resource set as the multi-slot grant or in the one or more time gaps.

Aspect 24: The method of any of Aspects 22-23, wherein communicating in the multi-slot grant is resumed following the communication scheduled by the grant.

Aspect 25: An apparatus for wireless communication at a device, comprising a processor; memory coupled with the processor; and instructions stored in the memory and executable by the processor to cause the apparatus to perform the method of one or more Aspects of Aspects 1-12.

Aspect 26: A device for wireless communication, comprising a memory and one or more processors coupled to the memory, the memory and the one or more processors configured to perform the method of one or more Aspects of Aspects 1-12.

Aspect 27: An apparatus for wireless communication, comprising at least one means for performing the method of one or more Aspects of Aspects 1-12.

Aspect 28: A non-transitory computer-readable medium storing code for wireless communication, the code comprising instructions executable by a processor to perform the method of one or more Aspects of Aspects 1-12.

Aspect 29: A non-transitory computer-readable medium storing a set of instructions for wireless communication, the set of instructions comprising one or more instructions that, when executed by one or more processors of a device, cause the device to perform the method of one or more Aspects of Aspects 1-12.

Aspect 30: An apparatus for wireless communication at a device, comprising a processor; memory coupled with the processor; and instructions stored in the memory and executable by the processor to cause the apparatus to perform the method of one or more Aspects of Aspects 13-24.

Aspect 31: A device for wireless communication, comprising a memory and one or more processors coupled to the memory, the memory and the one or more processors configured to perform the method of one or more Aspects of Aspects 13-24.

Aspect 32: An apparatus for wireless communication, comprising at least one means for performing the method of one or more Aspects of Aspects 13-24.

Aspect 33: A non-transitory computer-readable medium storing code for wireless communication, the code comprising instructions executable by a processor to perform the method of one or more Aspects of Aspects 13-24.

Aspect 34: A non-transitory computer-readable medium storing a set of instructions for wireless communication, the set of instructions comprising one or more instructions that, when executed by one or more processors of a device, cause the device to perform the method of one or more Aspects of Aspects 13-24.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
one or more memories; and
one or more processors, coupled to the one or more memories, configured to:
receive a multi-slot grant indicating a plurality of slots for a first communication direction; and
communicate in the multi-slot grant based at least in part on information that provides an indication of one or more time gaps within the multi-slot grant, wherein the one or more time gaps correspond to one or more symbols within the multi-slot grant that correspond to a second communication direction that is different from the first communication direction, wherein one or more symbols of the multi-slot grant that overlap with the one or more time gaps are punctured or are rate matched around.

2. The UE of claim 1, wherein the one or more processors are further configured to:
receive the information via radio resource control signaling.

3. The UE of claim 2, wherein the one or more processors are further configured to:
receive an activation of the information via downlink control signaling.

4. The UE of claim 1, wherein the one or more processors, to communicate in the multi-slot grant, are configured to:
transmit or receive a communication in the one or more time gaps.

5. The UE of claim 1, wherein the information indicates a slot offset, relative to a first slot of the multi-slot grant, for the one or more time gaps and a start and length indicator value for the one or more time gaps.

6. The UE of claim 1, wherein the information indicates one or more slots or symbols of the multi-slot grant that are to be skipped for the one or more time gaps.

7. The UE of claim 1, wherein the information indicates a slot format indicator that identifies one or more symbols assigned to the second communication direction, and the one or more time gaps are determined to be associated with the one or more symbols.

8. The UE of claim 1, wherein locations of the one or more time gaps are respectively associated with one or more index values, and the information indicates the one or more index values.

9. The UE of claim 1, wherein the one or more time gaps are associated with a time gap pattern, and the information indicates that the time gap pattern is to be used for the multi-slot grant.

10. The UE of claim 1, wherein the one or more processors are further configured to:
receive a grant that schedules a communication within the multi-slot grant,
wherein one or more symbols of the multi-slot grant that overlap with the grant are punctured.

11. The UE of claim 10, wherein the grant is received in a same control resource set as the multi-slot grant or in the one or more time gaps.

12. The UE of claim 10, wherein communicating in the multi-slot grant is resumed following the communication scheduled by the grant.

13. The UE of claim 1, wherein the one or more processors are further configured to:
receive the information via downlink control signaling.

14. A base station for wireless communication, comprising:
one or more memories; and
one or more processors, coupled to the one or more memories, configured to:
transmit a multi-slot grant, indicating a plurality of slots for a first communication direction;
transmit, to a user equipment (UE), information that provides an indication of one or more time gaps within the multi-slot grant, wherein the one or more time gaps correspond to one or more symbols within the multi-slot grant that correspond to a second communication direction that is different from the first communication direction; and
communicate with the UE in the multi-slot grant according to the one or more time gaps, wherein one or more symbols of the multi-slot grant that overlap with the one or more time gaps are punctured or are rate matched around.

15. The base station of claim 14, wherein the information is transmitted via at least one of radio resource control signaling or downlink control information.

16. The base station of claim 14, wherein the one or more processors, to communicate in the multi-slot grant, are configured to:
transmit or receive a communication in the one or more time gaps.

17. The base station of claim 14, wherein the information indicates a slot offset, relative to a first slot of the multi-slot grant, for the one or more time gaps and a start and length indicator value for the one or more time gaps.

18. The base station of claim 14, wherein the information indicates one or more slots or symbols of the multi-slot grant that are to be skipped by the UE for the one or more time gaps.

19. The base station of claim 14, wherein the information indicates a slot format indicator that identifies one or more symbols assigned to the second communication direction, and the one or more time gaps are associated with the one or more symbols.

20. The base station of claim 14, wherein locations of the one or more time gaps are respectively associated with one or more index values, and the information indicates the one or more index values.

21. The base station of claim 14, wherein the one or more time gaps are associated with a gap pattern, and the information indicates that the gap pattern is to be used by the UE for the multi-slot grant.

22. The base station of claim 14, wherein the one or more processors are further configured to:
transmit a grant that schedules a communication within the multi-slot grant,
wherein one or more symbols of the multi-slot grant that overlap with the grant are to be punctured.

23. The base station of claim 22, wherein the grant is transmitted in a same control resource set as the multi-slot grant or in the one or more time gaps.

24. The base station of claim 22, wherein communicating in the multi-slot grant is resumed following the communication scheduled by the grant.

25. A method of wireless communication performed by a user equipment (UE), comprising:
receiving a multi-slot grant indicating a plurality of slots for a first communication direction; and
communicating in the multi-slot grant based at least in part on information that provides an indication of one or more time gaps within the multi-slot grant, wherein the one or more time gaps correspond to one or more symbols within the multi-slot grant that correspond to a second communication direction that is different from the first communication direction, wherein one or more symbols of the multi-slot grant that overlap with the one or more time gaps are punctured or are rate matched around.

26. The method of claim 25, wherein communicating in the multi-slot grant comprises:
transmitting or receiving a communication in the one or more time gaps.

27. The method of claim 25, further comprising:
receiving a grant that schedules a communication within the multi-slot grant,
  wherein one or more symbols of the multi-slot grant that overlap with the grant are punctured.

28. A method of wireless communication performed by a base station, comprising:
transmitting a multi-slot grant, indicating a plurality of slots for a first communication direction;
transmitting, to a user equipment (UE), information that provides an indication of one or more time gaps within the multi-slot grant, wherein the one or more time gaps correspond to one or more symbols within the multi-slot grant that correspond to a second communication direction that is different from the first communication direction; and
communicating with the UE in the multi-slot grant according to the one or more time gaps, wherein one or more symbols of the multi-slot grant that overlap with the one or more time gaps are punctured or are rate matched around.

29. The method of claim 28, wherein communicating in the multi-slot grant comprises:
transmitting or receiving a communication in the one or more time gaps.

30. The method of claim 28, further comprising:
transmitting a grant that schedules a communication within the multi-slot grant,
  wherein one or more symbols of the multi-slot grant that overlap with the grant are to be punctured.

* * * * *